United States Patent
Jarvi et al.

(10) Patent No.: US 10,713,914 B2
(45) Date of Patent: Jul. 14, 2020

(54) INTELLIGENT SECURITY MANAGEMENT SYSTEM

(71) Applicant: Rapiscan Systems, Inc., Torrance, CA (US)

(72) Inventors: Ari Jarvi, Espoo (FI); Jarno Tykkylainen, Helsinki (FI); Edward James Morton, Guildford (GB)

(73) Assignee: Rapiscan Systems, Inc., Torrance, CA (US)

( * ) Notice: Subject to any disclaimer, the term of this patent is extended or adjusted under 35 U.S.C. 154(b) by 0 days.

(21) Appl. No.: 16/148,719

(22) Filed: Oct. 1, 2018

(65) Prior Publication Data

US 2019/0139385 A1 May 9, 2019

Related U.S. Application Data

(63) Continuation of application No. 14/952,275, filed on Nov. 25, 2015, now Pat. No. 10,134,254.

(Continued)

(51) Int. Cl.
  *G08B 15/00* (2006.01)
  *G07C 9/22* (2020.01)
  (Continued)

(52) U.S. Cl.
  CPC .............. *G08B 15/00* (2013.01); *G01V 3/10* (2013.01); *G01V 5/0025* (2013.01); *G01V 8/10* (2013.01);
  (Continued)

(58) Field of Classification Search
  CPC .......... G01V 3/10; G01V 5/0025; G01V 8/10; G08B 15/00; G07C 9/00031; G07C 9/00087; G07C 9/00103; G07C 2209/02
  See application file for complete search history.

(56) References Cited

U.S. PATENT DOCUMENTS

| 3,551,675 A | 12/1970 | Miller |
| 3,655,215 A | 4/1972 | Becklin |

(Continued)

FOREIGN PATENT DOCUMENTS

| CN | 1490616 | 4/2004 |
| CN | 1715895 | 1/2006 |

(Continued)

OTHER PUBLICATIONS

Gerald J. Smith, 'Bodysearch Technology Uses X-ray Imaging to Remove Hazards and Humiliation from Personnel Searches', IEEE, 1995.

(Continued)

*Primary Examiner* — Hongmin Fan
(74) *Attorney, Agent, or Firm* — Novel IP

(57) ABSTRACT

The present specification describes a smart security management system for managing the flow of people through security checkpoints in order to optimize overall throughput and efficiency. In an embodiment, the system includes a centralized database which is connected to a plurality of security checkpoints and which uses benchmark response data generated by a specific type of screening devices for a set of individuals. In an embodiment, the response data gathered by similar types of screening devices located at security checkpoints is compared with the benchmark response data stored in a centralized database to provide faster security clearance to individuals.

24 Claims, 8 Drawing Sheets

Related U.S. Application Data

(60) Provisional application No. 62/084,193, filed on Nov. 25, 2014.

(51) Int. Cl.

| | | |
|---|---|---|
| *G07C 9/27* | | (2020.01) |
| *G07C 9/25* | | (2020.01) |
| *G01V 3/10* | | (2006.01) |
| *G01V 5/00* | | (2006.01) |
| *G01V 8/10* | | (2006.01) |

(52) U.S. Cl.
CPC .............. *G07C 9/22* (2020.01); *G07C 9/257* (2020.01); *G07C 9/27* (2020.01); *G07C 2209/02* (2013.01)

(56) References Cited

U.S. PATENT DOCUMENTS

| | | |
|---|---|---|
| 3,678,278 A | 7/1972 | Peil |
| 3,780,291 A | 12/1973 | Stein |
| 3,790,799 A | 2/1974 | Stein |
| 3,843,881 A | 10/1974 | Barton |
| 3,884,816 A | 5/1975 | Takahashi |
| 3,919,467 A | 11/1975 | Peugeot |
| 3,924,064 A | 12/1975 | Nomura |
| 3,961,186 A | 6/1976 | Leunbach |
| 3,971,948 A | 7/1976 | Pfeiler |
| 3,990,175 A | 11/1976 | Conway |
| 4,008,400 A | 2/1977 | Brunnett |
| 4,020,346 A | 4/1977 | Dennis |
| 4,031,545 A | 6/1977 | Stein |
| 4,047,035 A | 9/1977 | Dennhoven |
| 4,064,440 A | 12/1977 | Roder |
| 4,070,576 A | 1/1978 | Cobb |
| 4,107,532 A | 8/1978 | Macovski |
| 4,112,301 A | 9/1978 | Annis |
| 4,139,771 A | 2/1979 | Dennhoven |
| 4,160,165 A | 7/1979 | McCombs |
| 4,179,100 A | 12/1979 | Sashin |
| 4,196,352 A | 4/1980 | Berninger |
| 4,200,800 A | 4/1980 | Swift |
| 4,228,353 A | 10/1980 | Johnson |
| 4,228,357 A | 10/1980 | Annis |
| 4,242,583 A | 12/1980 | Annis |
| 4,242,588 A | 12/1980 | Huang |
| 4,260,898 A | 4/1981 | Annis |
| 4,298,800 A | 11/1981 | Goldman |
| 4,303,830 A | 12/1981 | Heinzelmann |
| 4,342,914 A | 8/1982 | Bjorkholm |
| 4,349,739 A | 9/1982 | Annis |
| 4,366,382 A | 12/1982 | Kotowski |
| 4,366,576 A | 12/1982 | Annis |
| 4,380,817 A | 4/1983 | Harding |
| 4,389,729 A | 6/1983 | Stein |
| 4,414,682 A | 11/1983 | Annis |
| 4,422,177 A | 12/1983 | Mastronardi |
| 4,426,721 A | 1/1984 | Wang |
| 4,454,605 A | 6/1984 | Delucia |
| 4,472,822 A | 9/1984 | Swift |
| 4,503,332 A | 3/1985 | Annis |
| 4,514,691 A | 4/1985 | De |
| 4,525,854 A | 6/1985 | Molbert |
| 4,535,245 A | 8/1985 | Zonneveld |
| 4,549,307 A | 10/1985 | Macovski |
| 4,578,806 A | 3/1986 | Grass |
| 4,586,441 A | 5/1986 | Zekich |
| 4,598,415 A | 7/1986 | Luccio |
| 4,672,837 A | 6/1987 | Cottrell |
| 4,692,937 A | 9/1987 | Sashin |
| 4,711,994 A | 12/1987 | Greenberg |
| 4,736,401 A | 4/1988 | Donges |
| 4,745,631 A | 5/1988 | Paolini |
| 4,756,015 A | 7/1988 | Doenges |
| 4,759,047 A | 7/1988 | Donges |
| 4,768,214 A | 8/1988 | Bjorkholm |
| 4,783,794 A | 11/1988 | Dietrich |
| 4,799,247 A | 1/1989 | Annis |
| 4,807,637 A | 2/1989 | Bjorkholm |
| 4,809,312 A | 2/1989 | Annis |
| 4,817,121 A | 3/1989 | Shimizu |
| 4,819,256 A | 4/1989 | Annis |
| 4,821,023 A | 4/1989 | Parks |
| 4,825,454 A | 4/1989 | Annis |
| 4,839,913 A | 6/1989 | Annis |
| 4,841,555 A | 6/1989 | Doi |
| 4,845,769 A | 7/1989 | Burstein |
| 4,864,142 A | 9/1989 | Gomberg |
| 4,870,670 A | 9/1989 | Geus |
| 4,884,289 A | 11/1989 | Glockmann |
| 4,890,310 A | 12/1989 | Umetani |
| 4,893,015 A | 1/1990 | Kubierschky |
| 4,894,619 A | 1/1990 | Leinonen |
| 4,899,283 A | 2/1990 | Annis |
| 4,961,214 A | 10/1990 | Van |
| 4,974,247 A | 11/1990 | Friddell |
| 4,979,137 A | 12/1990 | Gerstenfeld |
| 4,995,066 A | 2/1991 | Harding |
| 5,007,072 A | 4/1991 | Jenkins |
| 5,022,062 A | 6/1991 | Annis |
| 5,033,073 A | 7/1991 | Friddell |
| 5,038,370 A | 8/1991 | Harding |
| 5,039,981 A | 8/1991 | Rodriguez |
| 5,044,002 A | 8/1991 | Stein |
| 5,084,619 A | 1/1992 | Pfeiler |
| 5,115,459 A | 5/1992 | Bertozzi |
| 5,120,706 A | 6/1992 | Weeks |
| 5,121,105 A | 6/1992 | Aittoniemi |
| 5,127,030 A | 6/1992 | Annis |
| 5,132,995 A | 7/1992 | Stein |
| 5,156,270 A | 10/1992 | Kachel |
| 5,179,581 A | 1/1993 | Annis |
| 5,181,234 A | 1/1993 | Smith |
| 5,182,764 A | 1/1993 | Peschmann |
| 5,212,720 A | 5/1993 | Landi |
| 5,224,144 A | 6/1993 | Annis |
| 5,243,693 A | 9/1993 | Maron |
| 5,247,561 A | 9/1993 | Kotowski |
| 5,253,283 A | 10/1993 | Annis |
| 5,260,982 A | 11/1993 | Fujii |
| 5,313,511 A | 5/1994 | Annis |
| 5,367,552 A | 11/1994 | Peschmann |
| 5,394,454 A | 2/1995 | Harding |
| 5,397,986 A | 3/1995 | Conway |
| 5,414,225 A | 5/1995 | Garfinkle |
| 5,420,905 A | 5/1995 | Bertozzi |
| 5,430,787 A | 7/1995 | Norton |
| 5,463,224 A | 10/1995 | Burstein |
| 5,483,569 A | 1/1996 | Annis |
| 5,490,218 A | 2/1996 | Krug |
| 5,493,596 A | 2/1996 | Annis |
| 5,503,424 A | 4/1996 | Agopian |
| 5,524,133 A | 6/1996 | Neale |
| 5,528,656 A | 6/1996 | Annis |
| 5,572,121 A | 11/1996 | Beswick |
| 5,579,360 A | 11/1996 | Abdel-Mottaleb |
| 5,590,057 A | 12/1996 | Fletcher |
| 5,600,303 A | 2/1997 | Husseiny |
| 5,600,700 A | 2/1997 | Krug |
| 5,602,893 A | 2/1997 | Harding |
| 5,638,420 A | 6/1997 | Armistead |
| 5,642,393 A | 6/1997 | Krug |
| 5,642,394 A | 6/1997 | Rothschild |
| 5,660,549 A | 8/1997 | Witt |
| 5,666,393 A | 9/1997 | Annis |
| 5,692,028 A | 11/1997 | Geus |
| 5,692,029 A | 11/1997 | Husseiny |
| 5,696,806 A | 12/1997 | Grodzins |
| 5,699,400 A | 12/1997 | Lee |
| 5,763,886 A | 6/1998 | Schulte |
| 5,764,683 A | 6/1998 | Swift |
| 5,796,110 A | 8/1998 | An |
| 5,838,758 A | 11/1998 | Krug |
| 5,882,206 A | 3/1999 | Gillio |

(56) References Cited

U.S. PATENT DOCUMENTS

| | | |
|---|---|---|
| 5,892,840 A | 4/1999 | Jang |
| 5,910,973 A | 6/1999 | Grodzins |
| 5,930,326 A | 7/1999 | Rothschild |
| 5,940,468 A | 8/1999 | Huang |
| 5,966,422 A | 10/1999 | Dafni |
| 5,974,111 A | 10/1999 | Krug |
| 6,018,562 A | 1/2000 | Willson |
| 6,044,353 A | 3/2000 | Pugliese |
| 6,057,761 A | 5/2000 | Yukl |
| 6,081,580 A | 6/2000 | Grodzins |
| 6,094,472 A | 7/2000 | Smith |
| 6,137,895 A | 10/2000 | Al-Sheikh |
| 6,151,381 A | 11/2000 | Grodzins |
| 6,192,104 B1 | 2/2001 | Adams |
| 6,212,251 B1 | 4/2001 | Tomura |
| 6,236,709 B1 | 5/2001 | Perry |
| 6,249,567 B1 | 6/2001 | Rothschild |
| 6,269,142 B1 | 7/2001 | Smith |
| 6,272,206 B1 | 8/2001 | Bjorkholm |
| 6,278,115 B1 | 8/2001 | Annis |
| 6,282,260 B1 | 8/2001 | Grodzins |
| 6,282,264 B1 | 8/2001 | Smith |
| 6,298,603 B1 | 10/2001 | Diaz |
| 6,301,326 B2 | 10/2001 | Bjorkholm |
| 6,301,327 B1 | 10/2001 | Martens |
| 6,308,644 B1 | 10/2001 | Diaz |
| 6,315,308 B1 | 11/2001 | Konopka |
| RE37,467 E | 12/2001 | Brasch |
| 6,356,620 B1 | 3/2002 | Rothschild |
| 6,366,203 B1 | 4/2002 | Burns |
| 6,370,222 B1 | 4/2002 | Cornick |
| 6,375,697 B2 | 4/2002 | Davies |
| 6,393,095 B1 | 5/2002 | Robinson |
| 6,418,194 B1 | 7/2002 | McPherson |
| 6,421,420 B1 | 7/2002 | Grodzins |
| 6,424,695 B1 | 7/2002 | Grodzins |
| 6,434,219 B1 | 8/2002 | Rothschild |
| 6,442,233 B1 | 8/2002 | Grodzins |
| 6,453,007 B2 | 9/2002 | Adams |
| 6,459,761 B1 | 10/2002 | Grodzins |
| 6,459,764 B1 | 10/2002 | Chalmers |
| 6,473,487 B1 | 10/2002 | Le |
| 6,484,650 B1 | 11/2002 | Stomski |
| 6,507,278 B1 | 1/2003 | Brunetti |
| 6,542,574 B2 | 4/2003 | Grodzins |
| 6,543,599 B2 | 4/2003 | Jasinetzky |
| 6,546,072 B1 | 4/2003 | Chalmers |
| 6,552,346 B2 | 4/2003 | Verbinski |
| 6,553,096 B1 | 4/2003 | Zhou |
| 6,556,653 B2 | 4/2003 | Hussein |
| 6,567,496 B1 | 5/2003 | Sychev |
| 6,597,760 B2 | 7/2003 | Beneke |
| 6,610,977 B2 | 8/2003 | Megerle |
| 6,621,888 B2 | 9/2003 | Grodzins |
| 6,628,745 B1 | 9/2003 | Annis |
| 6,634,668 B2 | 10/2003 | Urffer |
| 6,653,588 B1 | 11/2003 | Gillard-Hickman |
| 6,665,373 B1 | 12/2003 | Kotowski |
| 6,674,367 B2 | 1/2004 | Sweatte |
| 6,707,879 B2 | 3/2004 | McClelland |
| 6,721,391 B2 | 4/2004 | McClelland |
| 6,742,301 B1 | 6/2004 | Schwarz |
| 6,745,520 B2 | 6/2004 | Puskaric |
| 6,749,207 B2 | 6/2004 | Nadeau |
| 6,754,304 B1 | 6/2004 | Kumakhov |
| 6,785,357 B2 | 8/2004 | Bernardi |
| 6,785,360 B1 | 8/2004 | Annis |
| 6,819,109 B2 | 11/2004 | Sowers |
| 6,819,241 B2 | 11/2004 | Turner |
| 6,839,403 B1 | 1/2005 | Kotowski |
| 6,848,826 B2 | 2/2005 | Marie |
| 6,856,667 B2 | 2/2005 | Ellenbogen |
| 6,870,791 B1 | 3/2005 | Caulfield |
| 6,876,719 B2 | 4/2005 | Ozaki |
| 6,879,657 B2 | 4/2005 | Hoffman |
| 6,891,381 B2 | 5/2005 | Bailey |
| 6,899,540 B1 | 5/2005 | Neiderman |
| 6,901,346 B2 | 5/2005 | Tracy |
| 6,911,907 B2 | 6/2005 | Kelliher |
| 6,952,163 B2 | 10/2005 | Huey |
| 6,965,340 B1 | 11/2005 | Baharav |
| 6,967,612 B1 | 11/2005 | Gorman |
| 6,970,086 B2 | 11/2005 | Nelson |
| 6,970,087 B2 | 11/2005 | Stis |
| 6,990,175 B2 | 1/2006 | Nakashima |
| 7,007,298 B1 | 2/2006 | Shinzaki |
| 7,016,459 B2 | 3/2006 | Ellenbogen |
| 7,053,785 B2 | 5/2006 | Akins |
| 7,092,485 B2 | 8/2006 | Kravis |
| 7,099,434 B2 | 8/2006 | Adams |
| 7,103,137 B2 | 9/2006 | Seppi |
| 7,110,493 B1 | 9/2006 | Kotowski |
| 7,110,925 B2 | 9/2006 | Pendergraft |
| 7,114,849 B2 | 10/2006 | Atzinger |
| 7,142,638 B2 | 11/2006 | Polichar |
| 7,162,005 B2 | 1/2007 | Bjorkholm |
| 7,164,747 B2 | 1/2007 | Ellenbogen |
| 7,185,206 B2 | 2/2007 | Goldstein |
| 7,203,276 B2 | 4/2007 | Arsenault |
| 7,218,704 B1 | 5/2007 | Adams |
| 7,257,189 B2 | 8/2007 | Modica |
| 7,265,709 B2 | 9/2007 | Fleisher |
| 7,286,634 B2 | 10/2007 | Sommer |
| 7,305,062 B2 | 12/2007 | Hambuechen |
| 7,305,063 B2 | 12/2007 | Heuscher |
| 7,317,390 B2 | 1/2008 | Huey |
| 7,322,745 B2 | 1/2008 | Agrawal |
| 7,330,529 B2 | 2/2008 | Kautzer |
| 7,333,587 B2 | 2/2008 | De |
| 7,356,115 B2 | 4/2008 | Ford |
| 7,365,672 B2 | 4/2008 | Keller |
| 7,400,701 B1 | 7/2008 | Cason |
| 7,418,077 B2 | 8/2008 | Gray |
| 7,460,636 B2 | 12/2008 | Ein-Gal |
| 7,471,764 B2 | 12/2008 | Kaval |
| 7,476,023 B1 | 1/2009 | Canfield |
| 7,505,556 B2 | 3/2009 | Chalmers |
| 7,505,557 B2 | 3/2009 | Modica |
| 7,505,562 B2 | 3/2009 | Dinca |
| 7,551,709 B2 | 6/2009 | Schlomka |
| 7,551,715 B2 | 6/2009 | Rothschild |
| 7,555,099 B2 | 6/2009 | Rothschild |
| 7,558,370 B2 | 7/2009 | Sommer |
| 7,561,666 B2 | 7/2009 | Annis |
| 7,577,234 B2 | 8/2009 | Knoespel |
| 7,593,506 B2 | 9/2009 | Cason |
| 7,593,510 B2 | 9/2009 | Rothschild |
| 7,639,866 B2 | 12/2009 | Pomero |
| 7,660,388 B2 | 2/2010 | Gray |
| 7,684,544 B2 | 3/2010 | Wilson |
| 7,783,004 B2 | 8/2010 | Kotowski |
| 7,796,394 B2 | 9/2010 | Wang |
| 7,796,733 B2 | 9/2010 | Hughes |
| 7,796,734 B2 | 9/2010 | Mastronardi |
| 7,806,589 B2 | 10/2010 | Tashman |
| 7,809,109 B2 | 10/2010 | Mastronardi |
| 7,817,776 B2 | 10/2010 | Agrawal |
| 7,826,589 B2 | 11/2010 | Kotowski |
| 7,984,940 B2 | 7/2011 | Chen |
| 8,003,949 B2 | 8/2011 | Ryge |
| 8,054,938 B2 | 11/2011 | Kaval |
| 8,116,575 B1 | 2/2012 | Saisan |
| 8,135,112 B2 | 3/2012 | Hughes |
| 8,194,822 B2 | 6/2012 | Rothschild |
| 8,199,996 B2 | 6/2012 | Hughes |
| 8,275,092 B1 | 9/2012 | Zhang |
| 8,275,093 B2 | 9/2012 | Rothschild |
| 8,325,871 B2 | 12/2012 | Grodzins |
| 8,442,186 B2 | 5/2013 | Rothschild |
| 8,576,982 B2 | 11/2013 | Gray |
| 8,576,989 B2 | 11/2013 | Kaminski |
| 8,605,859 B2 | 12/2013 | Mastronardi |
| 8,638,904 B2 | 1/2014 | Gray |
| 8,654,922 B2 | 2/2014 | Bendahan |

(56) References Cited

U.S. PATENT DOCUMENTS

| | | |
|---|---|---|
| 8,731,137 B2 | 5/2014 | Arroyo |
| 8,995,619 B2 | 3/2015 | Gray |
| 9,020,100 B2 | 4/2015 | Mastronardi |
| 9,535,019 B1 | 1/2017 | Rothschild |
| 2001/0021241 A1 | 9/2001 | Swift |
| 2002/0045152 A1 | 4/2002 | Viscardi |
| 2002/0136353 A1 | 9/2002 | Kang |
| 2002/0158750 A1 | 10/2002 | Almalik |
| 2003/0012338 A1 | 1/2003 | Lienard |
| 2003/0025302 A1 | 2/2003 | Urffer |
| 2003/0128099 A1 | 7/2003 | Cockerham |
| 2003/0171939 A1 | 9/2003 | Yagesh |
| 2003/0210139 A1 | 11/2003 | Brooks |
| 2003/0214407 A1 | 11/2003 | Sweatte |
| 2003/0225612 A1 | 12/2003 | Desimone |
| 2003/0229506 A1 | 12/2003 | Scott |
| 2004/0051265 A1 | 3/2004 | Nadeau |
| 2004/0088584 A1 | 5/2004 | Shachar |
| 2004/0109532 A1 | 6/2004 | Ford |
| 2004/0120454 A1 | 6/2004 | Ellenbogen |
| 2004/0125914 A1 | 7/2004 | Kang |
| 2004/0175018 A1 | 9/2004 | MacArthur |
| 2004/0252024 A1 | 12/2004 | Huey |
| 2005/0024199 A1 | 2/2005 | Huey |
| 2005/0031069 A1 | 2/2005 | Kaucic |
| 2005/0040226 A1 | 2/2005 | Al-Sheikh |
| 2005/0057354 A1 | 3/2005 | Jenkins |
| 2005/0074086 A1 | 4/2005 | Pendergraft |
| 2005/0100135 A1 | 5/2005 | Lowman |
| 2005/0146417 A1 | 7/2005 | Sweatte |
| 2005/0276379 A1 | 12/2005 | Polichar |
| 2006/0087439 A1 | 4/2006 | Tolliver |
| 2006/0182223 A1 | 8/2006 | Heuscher |
| 2006/0262902 A1 | 11/2006 | Wattenburg |
| 2007/0009088 A1 | 1/2007 | Edic |
| 2007/0024422 A1 | 2/2007 | Doyen |
| 2007/0058037 A1 | 3/2007 | Bergeron |
| 2007/0086564 A1 | 4/2007 | Bruder |
| 2007/0098142 A1 | 5/2007 | Rothschild |
| 2007/0109134 A1 | 5/2007 | Dugan |
| 2007/0172026 A1 | 7/2007 | Schlomka |
| 2007/0235652 A1 | 10/2007 | Smith |
| 2008/0144777 A1 | 6/2008 | Wilson |
| 2008/0212742 A1 | 9/2008 | Hughes |
| 2008/0302870 A1 | 12/2008 | Berini |
| 2009/0041186 A1 | 2/2009 | Gray |
| 2009/0074138 A1 | 3/2009 | Knoespel |
| 2009/0075325 A1 | 3/2009 | Das |
| 2009/0082762 A1 | 3/2009 | Ormsby |
| 2009/0103686 A1 | 4/2009 | Rothschild |
| 2009/0116614 A1 | 5/2009 | Kotowski |
| 2009/0116617 A1 | 5/2009 | Mastronardi |
| 2009/0160658 A1 | 6/2009 | Armstrong |
| 2009/0167042 A1 | 7/2009 | Chen |
| 2009/0245462 A1 | 10/2009 | Agrawal |
| 2009/0252295 A1 | 10/2009 | Foland |
| 2009/0257555 A1 | 10/2009 | Chalmers |
| 2010/0034451 A1 | 2/2010 | Hughes |
| 2010/0067654 A1 | 3/2010 | Kotowski |
| 2010/0158191 A1 | 6/2010 | Gray |
| 2011/0017917 A1 | 1/2011 | Mastronardi |
| 2011/0057029 A1 | 3/2011 | Daniel |
| 2011/0080999 A1 | 4/2011 | Kaval |
| 2011/0081099 A1 | 4/2011 | Hughes |
| 2011/0096901 A1 | 4/2011 | Kotowski |
| 2011/0129063 A1 | 6/2011 | Bendahan |
| 2011/0156864 A1* | 6/2011 | Green ................. G06K 19/025 340/5.2 |
| 2011/0164726 A1 | 7/2011 | Mastronardi |
| 2011/0274249 A1 | 11/2011 | Gray |
| 2011/0274250 A1 | 11/2011 | Gray |
| 2011/0281630 A1 | 11/2011 | Omar |
| 2011/0293072 A1 | 12/2011 | Kaminski |
| 2011/0299659 A1 | 12/2011 | Gray |
| 2012/0103061 A1 | 5/2012 | Nacson |
| 2012/0223130 A1 | 9/2012 | Knopp |
| 2012/0311939 A1 | 12/2012 | Barragan Olaya |
| 2013/0021192 A1* | 1/2013 | Daly ........................ G01V 3/15 342/22 |
| 2013/0076487 A1 | 3/2013 | Evers |
| 2013/0188842 A1 | 7/2013 | Hauke |
| 2013/0328664 A1 | 12/2013 | Torgersrud |
| 2014/0070946 A1 | 3/2014 | Ambrefe |
| 2014/0300503 A9 | 10/2014 | Daly |
| 2016/0247341 A1* | 8/2016 | Talwerdi .................. B42D 9/04 |

FOREIGN PATENT DOCUMENTS

| | | |
|---|---|---|
| CN | 1715895 A | 1/2006 |
| CN | 1764987 | 4/2006 |
| CN | 1802676 | 7/2006 |
| CN | 1846151 | 10/2006 |
| CN | 101083757 | 12/2007 |
| CN | 101379415 | 3/2009 |
| CN | 101644687 | 2/2010 |
| CN | 101071109 | 5/2010 |
| CN | 101467071 | 6/2012 |
| CN | 101185006 | 1/2013 |
| DE | 3141755 A1 | 7/1982 |
| EP | 0261984 A2 | 3/1988 |
| EP | 0533316 | 3/1993 |
| EP | 1635169 A1 | 3/2006 |
| EP | 1772874 A2 | 4/2007 |
| EP | 2520927 A1 | 11/2012 |
| EP | 2548011 | 1/2013 |
| EP | 2548012 | 1/2013 |
| JP | H4313052 | 11/1992 |
| JP | H6265485 | 9/1994 |
| JP | H10185842 | 7/1998 |
| JP | 2004251624 | 9/2004 |
| JP | 2007532876 | 11/2007 |
| JP | 2014006763 | 1/2014 |
| WO | 1988000698 | 1/1988 |
| WO | 9202937 A1 | 2/1992 |
| WO | 1992002937 | 2/1992 |
| WO | 1999021148 | 4/1999 |
| WO | 2005098400 | 10/2005 |
| WO | 2006027122 A1 | 3/2006 |
| WO | 2008088345 | 4/2008 |
| WO | 2009006044 | 1/2009 |
| WO | 2009082762 | 7/2009 |
| WO | 2009082762 A1 | 7/2009 |
| WO | 2011115923 A1 | 9/2011 |
| WO | 2011115930 A2 | 9/2011 |
| WO | 2011115934 A2 | 9/2011 |
| WO | 2011115935 A1 | 9/2011 |
| WO | 2014058495 | 4/2014 |

OTHER PUBLICATIONS

ANSI, Radiation Safety for Personnel Security Screening Systems Using X-Rays, Apr. 3, 2002.

Murray et al., 'Exploitation of X-Ray Technology for the Detection of Contraband-Aviation Security Applications', European Conference on Security and Detection, Apr. 28-30, 1997.

CRS Report for Congress, Aviation Security Technologies and Procedures: Screening Passengers and Baggage, Oct. 26, 2001, pp. 1-12.

Rapiscan Security Products, Secure 1000 Concealed Object Detection System, Nov. 1998.

Rapiscan Security Products, Secure 1000 Brochure, 2002.

Daniel Strom, "Screening Individuals with Backscatter X-Ray Systems", Health Physics Society, Feb. 3, 2005.

Rapiscan Systems Secure 1000 Case Study, London Heathrow Terminal 4, Fall 2004.

MSNBC, "Airports Seek Hi-Tech Security", Apr. 3, 2002.

St. Bartholomew's Hospital, Radiation Safety Report on the Rapiscan Secure 1000 X-Ray System, Nov. 4, 2004.

International Search Report for PCT/US2015/062683, dated Jun. 6, 2016.

* cited by examiner

INTELLIGENT SECURITY MANAGEMENT SYSTEM

CROSS-REFERENCE TO RELATED APPLICATIONS

The present application is a continuation application of U.S. patent application Ser. No. 14/952,275, entitled "Intelligent Security Management System" and filed on Nov. 25, 2015, which relies on, for priority, U.S. Patent Provisional Application No. 62/084,193, of the same title and filed on Nov. 25, 2014, for priority. The above-mentioned applications are herein incorporated by reference in their entirety.

FIELD

The present specification relates generally to intelligent systems and methods of managing the flow of people through security checkpoints in order to optimize overall throughput, efficiency and staffing needs.

BACKGROUND

Locations must often be secured to ensure public safety and welfare. For example, places where there are large concentrations of people, such as airports or entertainment events, places that are of particular governmental importance, such as courthouses and government buildings, and other places where the threat of violence is high, such as prisons, require security measures to thwart dangerous or illegal activities. The primary security objective is to prevent the unauthorized entry of weapons, dangerous materials, illegal items, or other contraband into the location, thereby securing it. This is often achieved by requiring all people and items to enter into the location through defined checkpoints and, in those checkpoints, subjecting those people and items to thorough searches.

Currently, various devices are used to perform such searches. Regardless of the place of use, these detection systems are employed to detect the presence of contraband on the body or luggage of individuals entering the secure area. Contraband is not limited to weapons and arms, but rather it includes explosives (fireworks, ammunition, sparklers, matches, gunpowder, signal flares); weapons (guns, swords, pepper sprays, martial arts weapons, knives); pressurized containers (hair sprays, insect repellant, oxygen/propane tanks); poisons (insecticides, pesticides, arsenic, cyanide); household items (flammable liquids, solvents, bleach); and corrosives (acids, lye, mercury).

People screening systems such as metal detectors are deployed at defined checkpoints to detect threat items such as weapons, explosives, and other dangerous objects concealed under clothing and within clothing. Such conventional security systems rely on data independently recorded at the time of screening to evaluate the possibility of a concealed threat item. There exist a wide range of threat items, which are difficult to be automatically and conclusively detected by automated algorithmic-based detection systems thereby necessitating a need for physical search of personnel. A full physical or a body pat-down search is often time-consuming, resource-intensive, and uncomfortable for both the security personnel and the subject under inspection. The time consumed in performing full-body pat-downs further decreases throughput, thus making the process slow and inconvenient for other subjects who are in queue for security screening.

The conventional security systems such as metal detector systems do not rely on any kind of data driven artificial intelligence. These devices are not intelligent and do not relate the search results during a screening process with the past screening history of an individual. Every screened passenger is evaluated in the same way irrespective of the things he or she normally carries or the way he or she dresses. A typical metal detector system works to detect the presence of any conducting object present with the screened person in his or her clothing or belongings. In several instances, people normally wear or carry conducting objects such as metal ornaments or keys or a writing instrument. A typical metal detector is unable to conclusively distinguish between a threat element and a metal based non threat element such as a writing instrument leading to false alarm during the screening process. This generally requires the security personnel to perform a full body pat-down search of the screened personnel leading to inconvenience and reduced throughput.

In addition, screening checkpoints used in current security systems predominately operate using a single input and single output line approach. Because the metal detectors are unable to conclusively distinguish between threat items and non-threat items which are made of conducting materials, the complex security protocols being instituted require individuals to get many of their belongings such as wallets, mobile phones, keys and other items, scanned by an X-ray scanner. Usually this is done because some of these non-threat items can trigger false alarms when the individual passes through the metal detector. It takes a considerable amount of time for individuals to divest themselves of their belongings and to place them for separate screening. This divestiture process tends to happen serially with individuals waiting in line until they have access to the machine. Contributing to the lag associated with the divestiture process, current systems employ a single conveyor belt, upon which each of the individual passenger items must be placed in order for the items to pass through the x-ray machine. Once the items are scanned, they accumulate on the opposite side of the scanning machine, thus creating "traffic" on the belt until retrieved by the passenger/owner. The belt must often be stopped by the operator to prevent the backlog of unclaimed baggage from reversing into the x-ray machine.

U.S. patent application Ser. Nos. 14/944,067, 14/859,647, 14/531,485, 14/293,233, 14/280,774, 14/149,473, 14/104,508, 13/942,563, 13/903,598, 13/365,114, 13/175,785, 12/887,510, and 12/643,021 and U.S. Pat. Nos. 9,182,516, 8,995,619, 8,774,362, 8,766,764, 8,654,922, 8,638,904, 8,576,982, 8,199,996, 8,135,112, 7,826,589, 7,796,733, 7,660,388, and 7,418,077 all disclose people screening systems and are all incorporated herein by reference in their entirety.

Despite the prior art efforts to improve methods, apparatuses, and systems for scanning individuals and carry-on baggage, the abovementioned problems have not been solved. The prior art methods fail to disclose methods and systems that reasonably alleviate delay during the divestiture process. In addition, the prior art does not improve the overall efficiency and throughput of the system.

Accordingly, there is need for an integrated system and process for effectively managing the flow of people through screening procedures. There is a need for an improved security check station that reduces the waiting time for individuals and has improved throughput and efficiency. Such a system would reduce over-staffing of security personnel, facilitate automation of the metal detector, curtail idle time of machine operators, and significantly increase throughput of the machines.

There is a need for an intelligent screening system that is able to evaluate the possibility of threat items based on the past screening history or a benchmark screening pattern for any individual. There is a need for an intelligent screening system where the plurality of information is centrally processed for yielding specific outputs to different users.

SUMMARY

In some embodiments, the present specification discloses an intelligent security management system for expediting security inspection of individuals. The system comprises: at least one database comprising one or more data records corresponding to each individual being inspected, the data records representing a characteristic data of each individual; and one or more security checkpoints comprising at least one inspection device, each security checkpoint being in data communication with the database for comparing inspection data of the individual collected by the inspection device with the characteristic data of the individual stored in the database, the individual being exempted from a second level of security inspection if the inspection data is similar to the characteristic data.

Optionally, each security checkpoint further comprises a tag reader machine for reading identifying information of an individual being inspected from an identification tag in possession of the individual, the identifying information being used to obtain the characteristic data of the individual from the database.

Optionally, each security checkpoint comprises a biometric reader machine for reading identifying information of an individual being inspected, the identifying information being used to obtain the characteristic data of the individual from the database.

Optionally, the database is remotely connected to each security point wirelessly, while in another embodiment, each security checkpoint comprises a replicated copy of the database.

Optionally, the inspection device is a metal detector comprising a plurality of sets of transmitter and receiver coils; and the inspection data of an individual comprises electromagnetic field signals induced in the receiver coils housed in the metal detector when the individual is inspected by using the metal detector.

Optionally, the inspection device is security scanner employing one of ultra-wide band, millimeter wave or terahertz imaging.

Optionally, the inspection device is a backscatter X-ray scanner.

In some embodiments, the present specification discloses an intelligent security management system comprising: a plurality of security checkpoints for inspecting individuals, the checkpoints being in data communication with a database comprising benchmark screening signatures of the individuals and wherein an individual is provided expedited security inspection at the security checkpoints if the inspection of the individual generates screening data lying within a pre-defined range of the screening signature of the individual. In an embodiment, the screening signature of an individual comprises typical response signals generated by a screening system when said individual is exposed to said screening system.

In some embodiments, the present specification discloses a method of inspecting an individual at a security checkpoint comprising: pre-screening the individual to obtain a characteristic data of the individual; storing the characteristic data; inspecting the individual at the security checkpoint to obtain an inspection data of the individual; comparing the inspection data with the stored characteristic data; and exempting the individual from at least a second level of security inspection if the inspection data lies within a predetermined range of the characteristic data.

Optionally, the method further comprises obtaining an identification of the individual for determining if a characteristic data of the individual is stored. In an embodiment, the identification of the individual is obtained by using a biometric reader provided at the security checkpoint; while in another embodiment, the identification of the individual is obtained by reading a tag comprising a unique identification code of the individual via a tag reader provided at the security checkpoint.

Optionally, pre-screening the individual to obtain a characteristic data of the individual comprises inspecting the individual by using a screening system and capturing typical response signals generated by the screening system when the individual is exposed to the screening system.

Optionally, the characteristic data of the individual is stored in a database comprising characteristic data of a plurality of individuals, the database being in communication with the security checkpoint. In an embodiment, the database is stored in a server remote to the security checkpoint; while in another embodiment, a replicated copy of the database is stored at the security checkpoint.

Optionally, the individual is inspected at the security checkpoint via a metal detector comprising a plurality of sets of transmitter and receiver coils; and the inspection data of the individual comprises electromagnetic field signals induced in the receiver coils of the metal detector when the individual is inspected via the metal detector.

Optionally, the inspection device is security scanner employing one of ultra-wide band, millimeter wave or terahertz imaging.

Optionally, the inspection device is a backscatter X-ray scanner.

The aforementioned and other embodiments of the present shall be described in greater depth in the drawings and detailed description provided below

BRIEF DESCRIPTION OF THE DRAWINGS

These and other features and advantages of the present invention will be appreciated, as they become better understood by reference to the following detailed description when considered in connection with the accompanying drawings, wherein.

DETAILED DESCRIPTION

Figure 1:
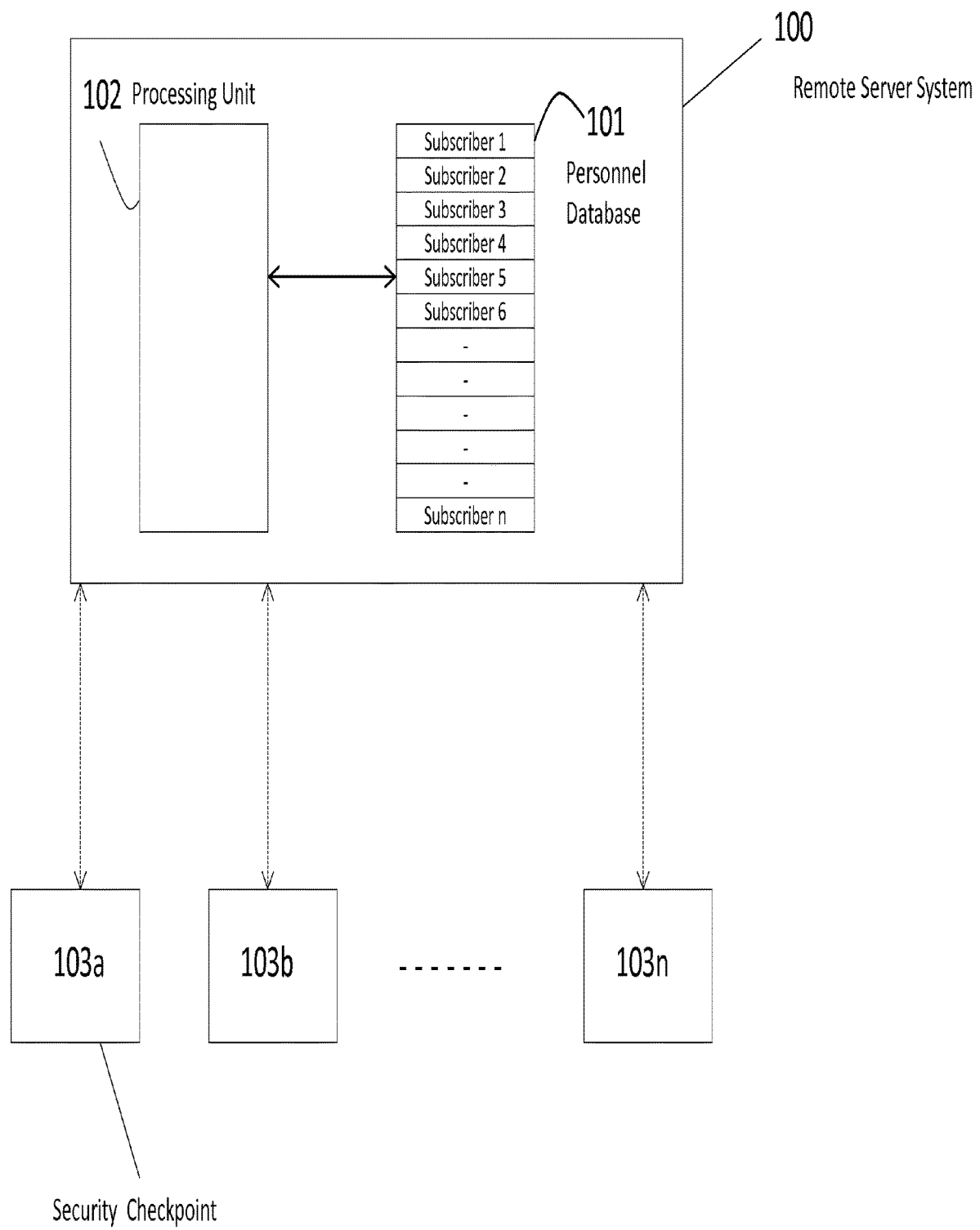
FIG. 1 is a block diagram illustrating an intelligent security management system in accordance with an embodiment of the present specification.

The present specification is directed towards an intelligent security management system which has higher throughput and efficiency than the conventional security screening systems commonly deployed at various security checkpoints in the country.

In an embodiment, the present specification describes an intelligent screening system comprising a database of people such that the information about individuals who subscribe to this screening system is pre-stored in this database, which is then used to provide faster clearance to these individuals during the screening process at security checkpoints.

In an embodiment, the intelligent screening system described in present the specification stores and uses the past screening history of an individual to estimate the presence or absence of a threat item during scanning. In an embodiment, the system described in the present specification collects and stores information representative of a benchmark screening result for each individual and uses this information as a base to detect any deviations that may require a second level of screenings such as a physical search. In case the screening results of an individual are in range of the benchmark screening results previously stored in the database, the second level of screening is avoided for such individuals providing them fast clearance.

In an embodiment, the present specification describes a screening system for transit points, such as airports and railway stations such that the interested passengers are required to subscribe to an assisted personnel screening program which requires the passengers to pre-register and have their details incorporated in a database to provide for faster clearance in the future at all security checkpoints linked to such database. In an embodiment, the passengers who subscribe to an assisted passenger screening program are screened to collect their benchmark screening result pattern which is then stored in a database linked to various security checkpoints. In an embodiment, the passengers are allocated a tag or a card which is linked to their profile stored in the database. The passengers can use this tag or card to get faster clearance at various security checkpoints which are linked to the assisted passenger screening program. In another embodiment, the passengers are not allocated any tag or card; however the biometric information of passengers is stored along with their profile and various security checkpoints linked to the assisted passenger program are equipped with biometric readers to access passenger profiles and provide faster clearance.

In an embodiment of the present specification, the assisted personnel screening program is deployed at various security checkpoints such as airports, railway stations, government establishments, sporting and concert venues, and hotels etc. which are linked to a common database of known personnel to provide faster clearance during the screening process.

In various embodiments, the intelligent screening system of the present specification is enabled by a personnel screening system. In some embodiments, the personnel screening system comprises a metal detector configured to detect electromagnetic field (EMF) signals, a security screening system configured to use ultra-wide band, millimeter wave, or terahertz technology, and/or an X-ray based screening system. In a metal detector embodiment, the metal detector comprises an electronic instrument which detects the presence of conducting material passing through a defined inspection region. Common types of metal detectors are stationary "walk through" metal detectors used for security screening at access points in prisons, courthouses, and airports to detect concealed metal weapons on a person's body. Metal detectors work by transmitting an electromagnetic field from a set of transmitter coils. Any metal objects (targets) within the electromagnetic field become energized and retransmit an electromagnetic field of their own. Receiver coils on the opposite side of the inspection region receive the retransmitted field and the system alerts the user by producing a target response.

In an embodiment of the present specification, the benchmark screening pattern of an individual is recorded using a metal detector, wherein the output of the metal detector is a signal characteristic of the individual, which is derived from the outputs of a plurality of transmitter—receiver coil combinations positioned in the metal detector. The benchmark screening pattern is created during multiple walk-throughs of the individual through the metal detectors of the scanning system, as described further with reference to FIG. 3. The benchmark is initially established using multiple scans when the individual first signs up with the screening system and, in some embodiments, is continuously modified based on on-going scans as the individual passes through the system during subsequent travel. Typically, a metal detector has a set of transmitter coils which are energized in sequence, the energizing frequency being typically in the range 2 kHz to 50 kHz. The metal detector also contains a number of receiving coils (the number of transmitter coils and receiver coils normally being equal). The receiver coils are placed opposing the transmitter coils, separated by a distance large enough for a passenger to walk between them (typically 800 mm to 1200 mm apart). Each receiver coil responds to the signal from the transmitter coils, the induced electromagnetic signal being dependent on the geometry between the coils and the size and shape of the individual passing between them. The individual's characteristic EMF (electromagnetic field) is the aggregated signal of the signals from each of the receiver coils in response to each of the transmitter coils. In an embodiment, almost twenty measurements from individual coils in the metal detector are used to estimate the characteristic EMF of an individual. In another embodiment, both the amplitude and phase of each individual signal induced in the receiver coil are captured and used to calculate the aggregate characteristic EMF signal. The aggregate characteristic EMF signal is defined as a time-amplitude digitized signal from each of the receiver coils, collected in the time period between activation of the entrance and exit photoelectric cells of the metal detector. The time-amplitude data from each coil is stored as a waveform. Any walk through metal detector having any number of coils and specific coil geometry can be used with the embodiments of the present specification. In some embodiments, metal detectors having a greater number of coils are capable of capturing more information to generate a more specific signal.

In an embodiment, this signal is referred as the "individual EMF" or the "passenger EMF" and represents the electromagnetic field signal characteristic of the individual when that individual is exposed to a metal detector described above. In various embodiments, the EMF signal is defined in arbitrary units which relate to the relative permeability of the object(s) in the field between the coils. The permeability of a person is low but the mutual inductance of an object of interest in typically in the range of 100-1000.

In an embodiment of the present specification, the "individual EMF" of each person is stored under his profile in a database which can be accessed at various security checkpoints. When an individual passes through these security checkpoints, the new EMF (electromagnetic field) data gathered by the metal detectors positioned at these security checkpoints is compared by the characteristic "individual EMF" data of that individual which is stored in the database. In case the difference between the two signals is statistically significant, the individual is directed for second level of screening such as a physical search. In various embodiments, basic statistical matching, such as least squares minimization, is used to determine how closely the signals or waveforms from the new EMF match the stored EMF, thereby establishing statistical significance. In one embodiment, least squares minimization is used to establish statistical significance. In various embodiments, if the comparison is within a threshold range (e.g. residuals are less than a pre-determined number) for each receiver coil, then the new and stored EMF signals are considered matches. If there is a greater than threshold difference for one or more sets of EMF signal data, then an alarm is raised and the individual is directed toward a second level of screening.

One of ordinary skill in the art would appreciate that the characteristic EMF signal for an individual may not be the same under all conditions. Several factors such as difference in individual clothing, the type of metal detector unit, external noise signals etc. can impact the EMF signal. In an embodiment, the system that compares the characteristic "individual EMF" with the new EMF data gathered at any security checkpoint is intelligent enough to take into account such factors that may bring differences in the new EMF data and characteristic "individual EMF" data stored in the database. Some of these factors are differences between the days of the week (weekday or weekend) and seasonal variations which can lead to different EMF signals on account of differences in individual clothing pattern. In another embodiment, the system is intelligent and gradually adapts to store several characteristic "individual EMF" signals for each individual depending on the time of the day, day of the week or season for each individual. In various embodiments, every time an individual passes through the system, the system stores the EMF signal and the newly stored EMF signal forms part of the individual's database. The system then averages EMF signal data taken at similar times of day to create a smoother EMF signal. For example, an individual takes a lunchbox to work. At the start of the day the lunchbox would be full whereas in the afternoon the lunchbox would be empty. In another example, an individual going out on a weekend evening would be dressed differently than when they go to work during the week. For example, an individual taking a briefcase to work during the week will look different compared to the same individual going to the cinema on the weekend. As the EMF signal would be expected to be different, the system would be configured to "learn" the behavior pattern of the individual and then look for anomalies. Learning involves the system noting differences during each pass of an individual and creating "individual EMF" signals based on the average as a function of time of day, day of the week, and time of the year. During the screening process at any security checkpoint, depending on various factors such as those listed above, the most appropriate of these "individual EMF" signals is used as the benchmark signal for comparison purposes.

In an embodiment, the database comprising the profile and characteristic "individual EMF" of known individuals is stored in a remote server location and all security checkpoints are equipped to access the remote server location in real time for accessing profiles of known individuals passing through the security checkpoint. In an alternate embodiment, to aid faster processing, particularly in areas not having internet access or with slow data speeds, a local image of the database is also stored in the security checkpoint system such that the local database is regularly synchronized with the latest data stored in the master database located in the remote server location.

In another embodiment, a personnel screening system comprises a security scanner that employs ultra-wide band, millimeter wave, or terahertz technology. The use of a millimeter wave scanner will be described herein, although it should be understood that any security scanner using ultra-wide band, millimeter wave or terahertz technology may be employed. In various embodiments, a security scanner uses electromagnetic radiation to passively or actively scan an individual's entire body to create a three dimensional image of said body and detect objects concealed underneath said individual's clothing.

For example, millimeter wave scanners employ energy comprising extremely high frequency (EHF) radio frequency bands (wavelengths ranging from one to ten millimeters), for example in a range of 24-30 GHz. Clothing and other materials are translucent to these bands, allowing for the detection of objects underneath said clothing. Active millimeter wave scanners transmit electromagnetic radiation at an individual and then detect the reflected radiation to generate an image representative of the individual. Passive millimeter wave scanners detect ambient radiation and radiation emitted from an individual's body to generate an image representative of the individual.

In an embodiment of the present specification, the benchmark screening pattern of an individual is recorded using an ultrawide band, millimeter wave scanner, or terahertz security scanner wherein the output of the security scanner is an image characteristic of the individual. The benchmark screening pattern is created during multiple walk-throughs of the individual through the security scanner of the scanning system, as described further with reference to FIG. 3. The benchmark is initially established using multiple scans when the individual first signs up with the screening system and, in some embodiments, is continuously modified based on on-going scans as the individual passes through the system during subsequent travel. In an embodiment, this image is referred to as the "individual image" or the "passenger image" and represents the generated image characteristic of the individual when that individual is exposed to a security scanner as described above.

In an embodiment of the present specification, the "individual image" of each person is stored under his profile in a database which can be accessed at various security checkpoints. When an individual passes through these security checkpoints, the new image data generated by the security scanners positioned at these security checkpoints is compared by the characteristic "individual image" data of that individual which is stored in the database. In case the difference between the two images is statistically significant, the individual is directed for a second level of screening such as a physical search. In various embodiments, basic statistical matching is used to determine how closely the signals or waveforms from the new image match the stored image, thereby establishing statistical significance. In one embodiment, least squares minimization is used to establish statistical significance. In various embodiments, if the comparison is within a threshold range, then the new and stored security scanner images are considered matches. If there is a greater than threshold difference for one or more sets of image signal data, then an alarm is raised and the individual is directed toward a second level of screening.

One of ordinary skill in the art would appreciate that the characteristic security scanner generated image for an individual may not be the same under all conditions. Several factors such as difference in individual clothing, the type of security scanner, and external noise signals can impact the individual image. In an embodiment, the system that compares the characteristic "individual image" with the new image data generated at any security checkpoint is intelligent enough to take into account such factors that may bring differences in the new image data and characteristic "individual image" data stored in the database. Some of these factors are differences between the days of the week (weekday or weekend) and seasonal variations which can lead to different images on account of differences in individual clothing pattern. In another embodiment, the system is intelligent and gradually adapts to store several characteristic "individual images" for each individual depending on the time of the day, day of the week or season for each individual. During the screening process at any security checkpoint, depending on various factors such as those listed above, the most appropriate of these "individual images" is used as the benchmark signal for comparison purposes.

In an embodiment, the database comprising the profile and characteristic "individual image" of known individuals is stored in a remote server location and all security checkpoints are equipped to access the remote server location in real time for accessing profiles of known individuals passing through the security checkpoint. In an alternate embodiment, to aid faster processing, particularly in areas not having internet access or with slow data speeds, a local image of the database is also stored in the security checkpoint system such that the local database is regularly synchronized with the latest data stored in the master database located in the remote server location.

In other embodiments, a personnel screening system uses X-rays to scan an individual. For example, in some embodiments, the personnel screening system comprises a backscatter X-ray scanner. Backscatter X-ray scanners employ the Compton scattering effect of X-rays to generate two-dimensional images of individual's bodies and detect objects hidden on said bodies. X-rays are typically transmitted toward both sides of an individual's body and the reflected radiation is detected to generate an image of the body and any objects positioned thereon. The pattern of the image generated by the scanner is dependent upon the material property of the scanned objects.

In an embodiment of the present specification, the benchmark screening pattern of an individual is recorded using an X-ray scanner, wherein the output of the X-ray scanner is an X-ray image characteristic of the individual. The benchmark screening pattern is created during multiple walk-throughs of the individual through the X-ray scanner of the scanning system, as described further with reference to FIG. 3. The benchmark is initially established using multiple scans when the individual first signs up with the screening system and, in some embodiments, is continuously modified based on on-going scans as the individual passes through the system during subsequent travel. In an embodiment, this image is referred as the "individual X-ray image" or the "passenger X-ray image" and represents the generated image characteristic of the individual when that individual is exposed to an X-ray scanner described above.

In an embodiment of the present specification, the "individual X-ray image" of each person is stored under his profile in a database which can be accessed at various security checkpoints. When an individual passes through these security checkpoints, the new X-ray image data generated by the X-ray scanners positioned at these security checkpoints is compared by the characteristic "individual X-ray image" data of that individual which is stored in the database. In case the differences between the two signals are statistically significant, the individual is directed for a second level of screening such as a physical search. In various embodiments, basic statistical matching is used to determine how closely the signals or waveforms from the new image match the stored image, thereby establishing statistical significance. In one embodiment, least squares minimization is used to establish statistical significance. In various embodiments, if the comparison is within a threshold range, then the new and stored X-ray images are considered matches. If there is a greater than threshold difference for one or more sets of image signal data, then an alarm is raised and the individual is directed toward a second level of screening.

One of ordinary skill in the art would appreciate that the characteristic X-ray image for an individual may not be the same under all conditions. Several factors such as difference in individual clothing, the type of X-ray scanner, and external noise signals can impact the X-ray image. In an embodiment, the system that compares the characteristic "individual X-ray image" with the new X-ray image data generated at any security checkpoint is intelligent enough to take into account such factors that may bring differences in the new X-ray image data and characteristic "individual X-ray image" data stored in the database. Some of these factors are differences between the days of the week (weekday or weekend) and seasonal variations which can lead to different X-ray images on account of difference in individual clothing pattern. In another embodiment, the system is intelligent and gradually adapts to store several characteristic "individual X-ray images" for each individual depending on the time of the day, day of the week or season for each individual. During the screening process at any security checkpoint, depending on various factors such as those listed above, the most appropriate of these "individual X-ray images" is used as the benchmark signal for comparison purposes.

In some embodiments, the intelligent security management system of the present specification is capable of making a determination whether data, whichever form it may be presented in (EMF signals, individual images, X-ray images) is anomalous. Therefore, the system identifies patterns (for example day and time) through the broad representation of the data and identifies skews within this data. In some embodiments, the intelligent security management system allows for risk-based screening in which baselines are dynamic and can be set based on the security requirement. A threshold can therefore be fixed based on sensitivity and specificity, which results in a dynamic definition of an anomaly.

In some embodiments, threshold comparisons are based on techniques such as but not limited to a least squares minimization and various algorithms such as, but not limited to template matching, trained neural networks, and/or deep learning.

For example, in one embodiment where a metal detector is employed as the inspection device, the system looks for patterns (such as day and time) and the broad shape of the EMF (noting that multiple EMF signals are generated for coil signals collected from head to toe). Coil signals are based on a person's signature, which can be affected by at least height and weight of the person (coil loading). The system then employs a method such as a least squares minimization, which compares residuals to thresholds, where a different threshold is defined for each coil pair. For example, where the legs are moving due to the person walking, a wider variation is seen in the EMF signal than in the torso, where movement is much less and therefore, there is less variability scan to scan.

Also for example, multiple algorithms based on different techniques, such as but not limited to template matching, trained neural networks, and/or deep learning can be employed to look at the output of each of these methods for consistent "threat" signatures. For a simple least squares approach, a deviation in residual compared to the reference of +/−1 to 5% is typical (the magnitude of acceptable error being greater at the feet that at the torso). For machine learning type algorithms, the comparison results in a "probability of threat present". In one embodiment, for example, the "probability of threat present" can be defined as a threat present if the comparison value is >80%. In another embodiment, a binary output may be used, such as "threat" or "no threat". If and once a threat is identified, the physical search result is fed back to the database and the stored EMF is updated. This assists the machine learning algorithms to become more accurate and also provides a record for the system operator regarding detection vs false alarm rate, which can be used to tune detection thresholds and overall system sensitivity.

It should be noted that these techniques are employed regardless of the type of inspection device used and the output is fine tuned to correlate to the type of inspection device used.

In an embodiment, the database comprising the profile and characteristic "individual X-ray image" of known individuals is stored in a remote server location and all security checkpoints are equipped to access the remote server location in real time for accessing profiles of known individuals passing through the security checkpoint. In an alternate embodiment, to aid faster processing, particularly in areas not having internet access or with slow data speeds, a local image of the database is also stored in the security checkpoint system such that the local database is regularly synchronized with the latest data stored in the master database located in the remote server location.

The present specification is directed towards multiple embodiments. The following disclosure is provided in order to enable a person having ordinary skill in the art to practice the invention. Language used in this specification should not be interpreted as a general disavowal of any one specific embodiment or used to limit the claims beyond the meaning of the terms used therein. The general principles defined herein may be applied to other embodiments and applications without departing from the spirit and scope of the invention. Also, the terminology and phraseology used is for the purpose of describing exemplary embodiments and should not be considered limiting. Thus, the present invention is to be accorded the widest scope encompassing numerous alternatives, modifications and equivalents consistent with the principles and features disclosed. For purpose of clarity, details relating to technical material that is known in the technical fields related to the invention have not been described in detail so as not to unnecessarily obscure the present invention.

FIG. 1 illustrates an intelligent security management system in accordance with an embodiment of the present specification. As shown in FIG. 1, the intelligent security management system of the present specification comprises a remote server system 100 which comprises a personnel database 101 and a processing unit 102 which is in data communication with the personnel database 101. The remote server system 100 is also in data communication with a plurality of security checkpoints such as 103$a$, 103$b$ . . . 103$n$. In an embodiment, the personnel database 101 contains the profiles of various individuals (or passengers in case of an independent airport security system) who have been registered with the intelligent screening system described in the present specification. Individuals are registered with the intelligent screening system via a registration process, an embodiment of which is described in greater detail with reference to FIG. 3. For each individual registered with the system, the database 101 contains the record of information representative of the typical response of some specific type of screening systems located at the security checkpoints 103 when that individual is exposed to similar types of screening systems. For example, in some embodiments, the database 101 contains a record of information representative of the typical response of an individual exposed to a screening system as a function of time of day, day of the week, and time of the year or season (summer, winter) as individuals would be expected to wear different clothing depending on the season or local temperature, and this would result in a different signal or image (wherein whether a signal or image is generated is dependent upon the screening system employed).

In an embodiment, the security checkpoints 103 are located in different locations such as airport transit points, hotels, or important government establishments which require a restricted access and prior screening of individuals for threat items before allowing them to pass through.

The intelligent screening system of the present specification provides a potential faster clearance at these security checkpoints for individuals who are registered with it. In an embodiment, the registered individuals or passengers are provided tags which are associated with their profile stored in the database 101 located in remote server system 100. The tag contains a unique identification code corresponding to each registered individual linking the individual to corresponding characteristic EMF signal(s), security scanner (such as ultra-wide band, millimeter wave or terahertz) image, or X-ray image stored in the database 101. In various embodiments, the unique identification code comprises a radio-frequency identification (RFID) code, linear barcode, quick response (QR) code, or a magnetic strip or a chip similar to those on a credit card. When an individual approaches any of the security checkpoints 103 which are connected to the intelligent screening system described herein, the individual can use this tag to alert the system at security checkpoint that he or she might be considered for a faster security clearance. In an embodiment, the security checkpoints are equipped with tag readers to read the tags carried by individuals passing through the system. The system identifies the individual from this tag and subsequently, the individual is screened at the first level of the security system. The response of this security system is compared with the information stored under the profile of the individual in the remote database 101. The information stored in the remote database 101 contains the typical benchmark response of a similar kind of security system to the same individual.

In case there is no statistically significant difference between the new data generated by security system and the benchmark response data stored in the database, the individual is allowed faster clearance by bypassing at least one level of screening. However, in case the difference between two response patterns is statistically significant, the individual is directed for a second level of screening. In an embodiment, the second level of search comprises a full pat down physical search.

In an embodiment, the individuals are not provided with tags; however their biometric information is stored in the database and the same is scanned at the security checkpoints 103 to identify their profile from the database 101. In various embodiments, biometric information includes, but is not limited to fingerprint data, facial recognition data, and retinal scan data.

In an embodiment, the intelligent screening system of the present specification is enabled by a metal detector based screening mechanism. The benchmark screening pattern of an individual is recorded using a metal detector wherein the output of the metal detector is a signal characteristic of the individual, which is derived from the outputs of a plurality of transmitter—receiver coil combinations positioned in the metal detector. In an embodiment, this signal is referred as the "individual EMF" or the "passenger EMF". In another embodiment, the intelligent screening system of the present specification is enabled by a security scanning system, such as one employing ultra-wide band, millimeter wave, or terahertz technology. The benchmark screening pattern of an individual is recorded using a security scanning system, such as one employing ultra-wide band, millimeter wave, or terahertz technology, which generates a three-dimensional representative image of the individual. In an embodiment, this image is referred to as the "individual image" or the "passenger image". In another embodiment, the intelligent screening system of the present specification is enabled by an X-ray scanning mechanism. The benchmark screening pattern of an individual is recorded using a backscatter X-ray scanner which generates a two-dimensional representative image of the individual. In an embodiment, this image is referred to as the "individual X-ray image" or the "passenger X-ray image".

In an embodiment of the present specification, the "individual EMF", "individual image", or "individual X-ray image" for each person is stored under his profile in the database 101 which can be accessed at various security checkpoints 103. When an individual passes through the metal detectors, security scanners, or X-ray scanners positioned at these security checkpoints 103, the new EMF or image data gathered by these scanners is compared to the characteristic "individual EMF", "individual image", or "individual X-ray image" for that individual. In case the differences between the two signals or images are statistically significant, the individual is directed for a second level of screening such as a physical search.

In an embodiment, the intelligent screening system of the present specification records the "individual EMF", "individual image", or "individual X-ray image" of an individual only once at the time of registration or enrollment to the assisted screening program and uses the same benchmark EMF signal or image at various checkpoints for evaluating the threat perception. In another embodiment, the intelligent screening system of the present specification has intelligence and learning capability. The typical response signal of a metal detector, security scanner, or X-ray scanner to any individual, referred to as "individual EMF", "individual image", or "individual X-ray image" respectively, can change over time. The intelligent screening system of the present specification gradually adapts itself to compensate for these changes.

In an embodiment, the intelligent screening system records the past screening history of an individual from various security checkpoints and recalibrates the benchmark "individual EMF", "individual image", or "individual X-ray image" based on this data. In various embodiments, multiple EMF signals or images are recorded over a predefined interval of time and the benchmark "individual EMF", "individual image", or "individual X-ray image" is altered based upon differences in the recorded EMF signals or images. In various embodiments, the system stores the EMF or image data taken at different times of day, week, and year, and continuously merges these sets of data to continually update the benchmark "individual EMF", "individual image", or "individual X-ray image" based on the pattern of behavior of the individual. The system then compares the new EMF or image with the updated stored EM or image. If no significant difference is determined, the system uses the new scanned data to update the stored benchmark data. If the system discovers a significant difference, an alarm is raised, the individual is directed to a second level of screening, and the stored EMF or image data is not updated with the new scanned data.

In another embodiment, the intelligent screening system of the present specification takes into consideration various other internal and external factors which can impact the response signal generated by a scanner located at any security checkpoint 103. For e.g. the response pattern can vary depending on the clothing of the individual which in itself may depend on the time of day that individual is screened, or on some external noise signals in the vicinity of the scanner. In an embodiment, the intelligent screening system of the present specification takes all these factors into consideration while comparing the response signal generated at any security checkpoint 103 with the "individual EMF", "individual image", or "individual X-ray image" stored under his profile in database 101. In another embodiment, a plurality of "individual EMF" signals, "individual images", or "individual X-ray images" are estimated and stored by the intelligent screening system for each individual depending on the above factors and the most appropriate "passenger EMF" or "individual EMF", "passenger image" or "individual image", or "passenger X-ray image" or "individual X-ray image" is compared with the response signal generated at any security checkpoint 103. In various embodiments, the most appropriate EMF signal or image is based on the time of day, day of the week, and/or time/season of the year.

In an embodiment, the intelligent screening system of the present specification allows only a voluntary individual to subscribe to an assisted screening program and register with the database 101 to become eligible for fast clearance at security checkpoints 103. In another embodiment, the system automatically estimates and records "individual EMF" signals, "individual images", or "individual X-ray images"

based on past screening history of all individuals and uses it for efficient management of flow at security checkpoints.

Figure 2:
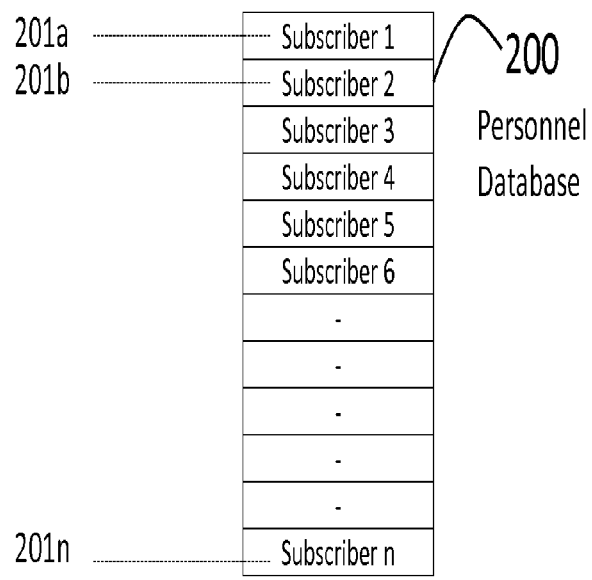
FIG. 2 illustrates a database comprising profiles of people registered with the intelligent security management system described in an embodiment of the present specification.

FIG. 2 illustrates a database comprising profiles of people registered with the intelligent security management system described in an embodiment of the present specification. As shown in FIG. 2, the database 200 comprises a plurality of profiles 201a, 201b . . . 201n corresponding to subscriber 1, subscriber 2 . . . subscriber n who are registered with the database. In an embodiment, each of the profiles 201a, 201b . . . 201n contains information representative of the "individual EMF", "individual image", or "individual X-ray image" or a typical response pattern of the person registered under the corresponding profile to a metal detector, security scanner, X-ray scanner, or any other kind of screening system. In another embodiment, each of the profiles 201a, 201b . . . 201n contains a plurality of "individual EMF", "individual image", or "individual X-ray image" data sets which are representative of the response pattern of same individual to the corresponding scanning system of the present specification under different operating or testing conditions.

Figure 3:
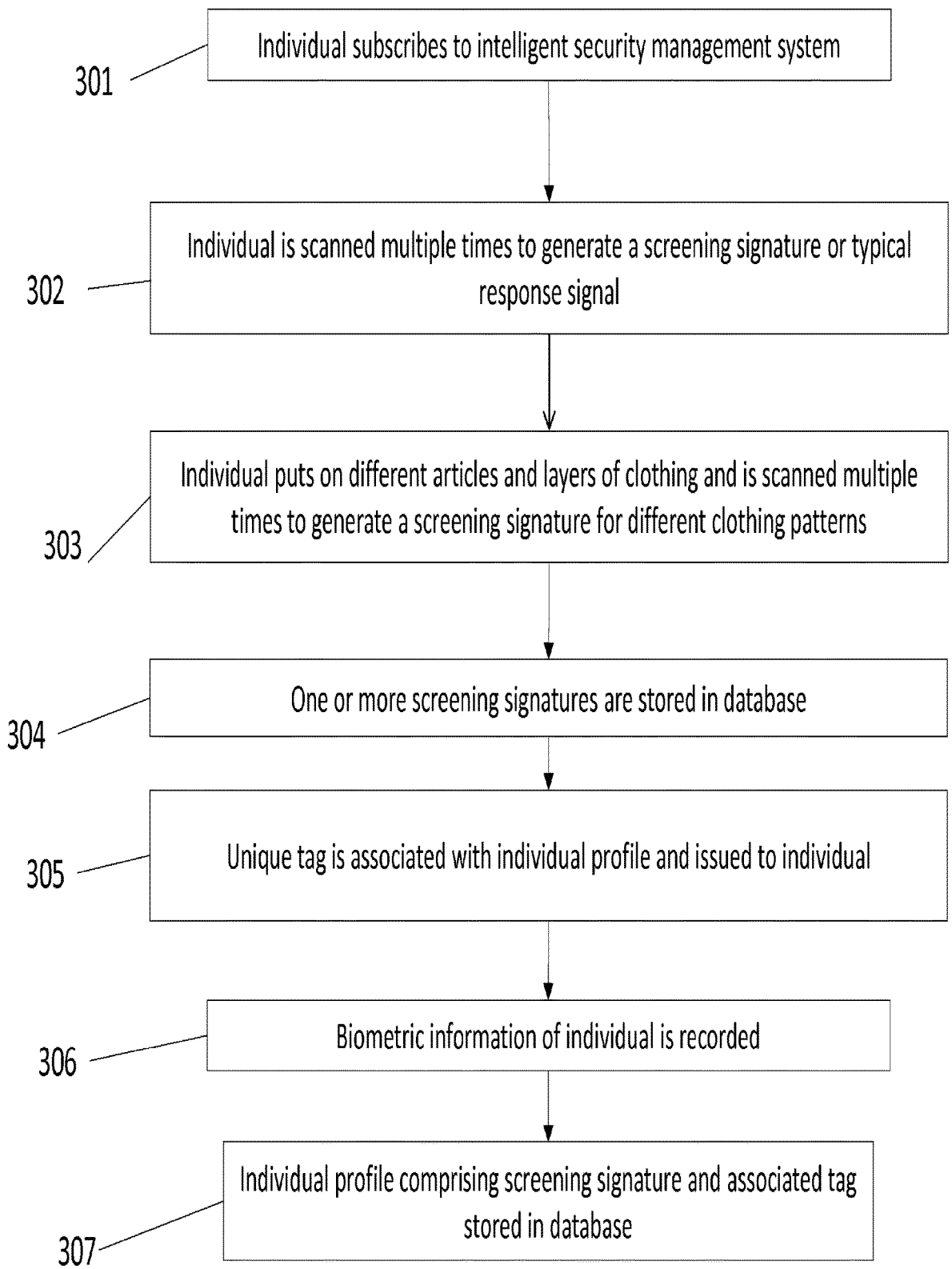
FIG. 3 is a flow diagram illustrating an exemplary sequence of steps for enrolling a new individual or passenger to the intelligent security management system described in an embodiment of the present specification.

FIG. 3 illustrates the sequence of steps followed for enrolling a new individual or passenger to the intelligent security management system described in an embodiment of the present specification. As shown in FIG. 3, at step 301, an individual subscribes to the intelligent security management system to become eligible for faster clearance at various security checkpoints enabled for such assisted screening programs. In various embodiments, subscribing to the intelligent security management system involves the individual providing his personal individual profile, including, but not limited to, name, address, and citizenship, to a database, such as database 101 of FIG. 1, of the security system, where it is stored. In some embodiments, the personal information is password protected by a password known to the individual and an owner of the security system. In an embodiment, enabled security checkpoints are those security checkpoints which are linked to the remote server system described in FIG. 1 and are equipped with the necessary equipment such as card readers or biometric scanners to identify program subscribers and access their profile in the remote server system. At step 302, the individual is scanned multiple times by the scanner of the security system to generate a characteristic screening signature or the typical response signal of the security screening system to the concerned individual. In an embodiment of the present specification, the scanner used is a metal detector and the screening signature is the "individual EMF" or typical aggregated electromagnetic field generated in receiver coils of the metal detector when the corresponding individual is exposed to the metal detector based screening system. In another embodiment, the scanner used is a security scanning system, such as one employing ultra-wide band, millimeter wave, or terahertz technology and the screening signature is an "individual image". In yet another embodiment, the scanner used is an X-ray scanner and the screening signature is an "individual X-ray image". Optionally, in an embodiment, during the registration process, an individual puts on a variety of different articles and layers of clothing and is scanned multiple times by the scanner of the security system to model characteristic screening signatures for different clothing patterns at step 303. At step 304, one or more screening signatures generated at steps 302 and/or 303 are stored in the system database. In an embodiment, at step 305, a unique tag is associated with each individual profile stored in the database and this tag is issued to the individuals who can get access to a faster clearance at security checkpoints using this tag. Optionally, at step 306, biometric information of the individual is recorded in addition to, or in place of, associating a unique tag with the individual. At step 307, the individual profiles, screening signatures, comprising the "individual EMF", "individual image", or "individual X-ray image", associated tags and/or biometric information are stored in a database such as database 101 illustrated in FIG. 1.

In some embodiments, the security checkpoints are equipped with biometric scanning machines to identify program subscribers and access their "individual EMF", "individual image", or "individual X-ray image" from their profiles located in the remote server.

Figure 4A:
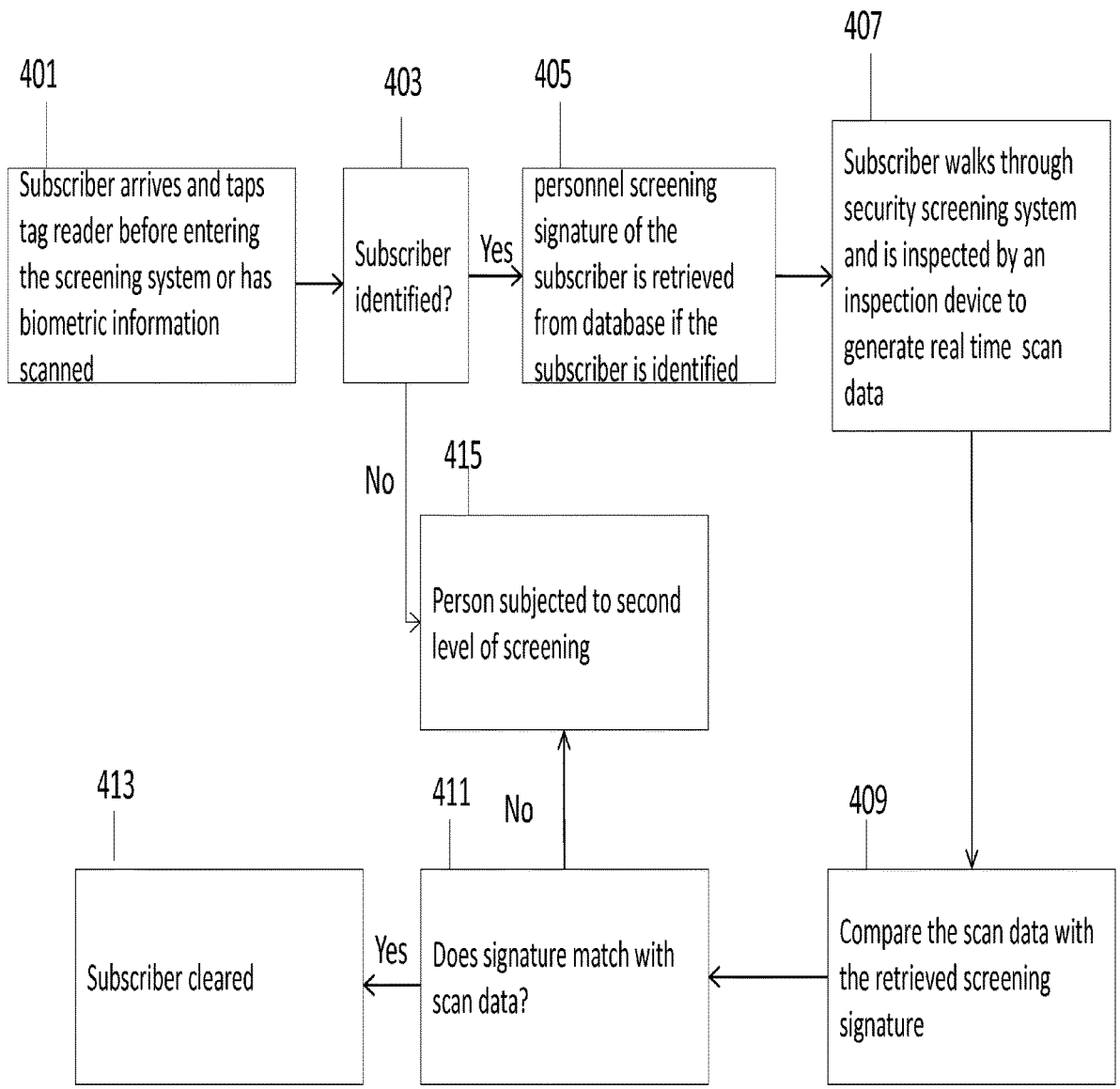
FIG. 4A is a flow diagram for illustrating an exemplary sequence of steps performed at participating or enabled security checkpoints in accordance with an embodiment of the present specification.

FIG. 4A illustrates the sequence of steps followed at a participating or enabled security checkpoints in accordance with an embodiment of the present specification. As shown in FIG. 4A, at step 401, a subscriber (or a passenger in case of checkpoints at transit points such as airports) arrives at an enabled security checkpoint and taps the tag reader or submits to biometric scanning (e.g. fingerprint or retinal scanning) before entering the screening system. An enabled or participating security checkpoint is the security checkpoint which is integrated with the intelligent screening system described in this specification and has been equipped to identify the subscribers of this system and provide them faster security clearance.

In an embodiment, tapping the tag reader means that the subscriber displays the tag issued to him in front of the tag reader positioned at the security checkpoint to allow the system to identify his profile from a database system such as the remote database system 101 described in FIG. 1. Optionally, a subscriber can be identified by biometric scanning. At step 403 it is determined if the subscriber is identified as being subscribed/registered with the intelligent screening system of the present specification. An individual is determined to be a subscriber (registered with the system) if the system finds a profile match in the database based on the information on his tag or based on the scanned biometrics. At step 405, if the subscriber is identified as being registered with the screening system, the system retrieves the screening signature ("individual EMF", "individual image", or "individual X-ray image") of the subscriber from the centralized database. In an embodiment of the present specification, the screening signature of a subscriber is the typical benchmark response pattern or signal generated by specific types of security screening systems (metal detector; security scanning system, such as one employing ultra-wide band, millimeter wave, or terahertz technology; or X-ray scanner) when the concerned subscriber is exposed to said specific types of screening systems.

At step 407, the subscriber walks through the screening system and is inspected by at least one inspection device to generate real time inspection data corresponding to the subscriber. At step 409, the real time inspection data generated by the screening system at step 407 is compared with the screening signature retrieved at step 405. At step 411, it is determined if the inspection data is similar to the retrieved signature corresponding to the subscriber. Note that the comparison is achieved by the least squares analysis or machine learning means described above. If the inspection data is similar to the retrieved signature, the subscriber is directed for faster security clearance at step 413. In an embodiment, faster security clearance means that at least one layer of security screening is bypassed for the positively cleared subscriber as described above. If the inspection data is not similar to the retrieved signature, the subscriber is directed for a second level of screening at step 415. The above mentioned procedure is followed to provide an expedited security clearance to subscribed personnel who enter the security checkpoint. At the same time, personnel who are not subscribed to the intelligent screening system of the present specification, as determined at step 403, are directly sent for a second level of screening at step 415, which is usually more time consuming.

In an embodiment, the participating or enabled security checkpoints of the intelligent screening system employ metal detectors. In such a case, at step 405, after identifying the subscriber, the system retrieves the screening signature of the concerned subscriber from the centralized database, wherein the screening signature comprises the typical "individual EMF" or electromagnetic field generated when the same subscriber is exposed to a metal detector similar to the metal detector employed at the security checkpoint. Also, in the above embodiment, at step 407, the subscriber walks through the metal detector, and at step 409, real time EMF signals captured by the metal detector are compared with the "individual EMF" of the subscriber. At step 411, the system checks if the real time EMF signals are similar to the benchmark "individual EMF" signal pre-stored for the subscriber. In case the results are similar, the subscriber is directed for faster security clearance, and in case the real time EMF signals are not similar to the pre-stored benchmark "individual EMF", the person is directed for a detailed physical search.

In another embodiment, the participating or enabled security checkpoints of the intelligent screening system employ a security scanning system, such as one employing ultra-wide band, millimeter wave, or terahertz technology. In such a case, at step 405, after identifying the subscriber, the system retrieves the screening signature of the concerned subscriber from the centralized database, wherein the screening signature comprises the typical "individual image" generated when the same subscriber is exposed to a security scanner employed at the security checkpoint. Also, in the above embodiment, at step 407, the subscriber walks through the security scanner, and at step 409, real time image data captured by the security scanner is compared with the "individual image" of the subscriber. At step 411, the system checks if the real time image is similar to the benchmark "individual image" pre-stored for the subscriber. In case the results are similar, the subscriber is directed for faster security clearance, and in case the real time image is not similar to the pre-stored benchmark "individual image", the person is directed for a detailed physical search.

In another embodiment, the participating or enabled security checkpoints of the intelligent screening system employ X-ray scanners. In such a case, at step 405, after identifying the subscriber, the system retrieves the screening signature of the concerned subscriber from the centralized database, wherein the screening signature comprises the typical "individual X-ray image" generated when the same subscriber is exposed to an X-ray scanner similar to the X-ray scanner employed at the security checkpoint. Also, in the above embodiment, at step 407, the subscriber walks through the X-ray scanner, and at step 409, real time image data captured by the X-ray scanner is compared with the "individual X-ray image" of the subscriber. At step 411, the system checks if the real time image is similar to the benchmark "individual X-ray image" pre-stored for the subscriber. In case the results are similar, the subscriber is directed for faster security clearance, and in case the real time image is not similar to the pre-stored benchmark "individual X-ray image", the person is directed for a detailed physical search.

Figure 4B:
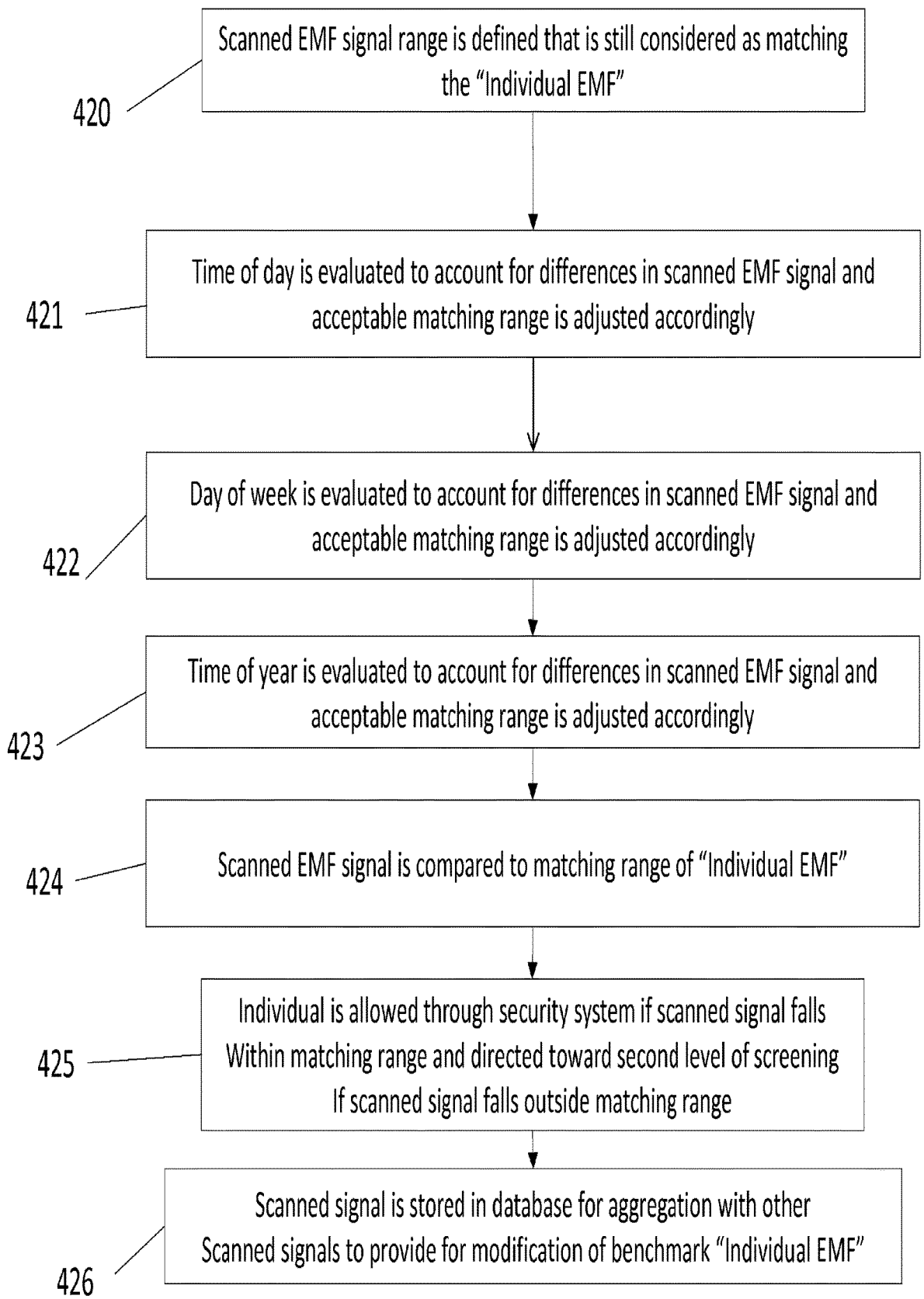
FIG. 4B is a flow chart illustrating the steps involved in comparing scanned data with a predetermined characteristic screening signature of an individual in accordance with one embodiment of the present specification.

FIG. 4B is a flow chart illustrating the steps involved in comparing scanned data with a predetermined characteristic screening signature of an individual in accordance with one embodiment of the present specification. Referring to FIG. 4B, the scanned data (EMF signal) and predetermined characteristic screening signature ("individual EMF") comprise signals obtained by a metal detector. The scanned data is generated in the moment and the predetermined characteristic screening signature is stored from the individual's registration process, which can also be altered over time based on differences from a multitude of scans. At step 420, a scanned EMF signal range is defined that is still considered as matching the "individual EMF". In some embodiments, the matching scanned EMF signal range is up to 10% different than the stored "individual EMF", and, more preferably, up to 5% different than the stored "individual EMF". At step 421, the time of day is evaluated to account for differences in the scanned EMF signal and the acceptable matching range is adjusted accordingly. At step 422, the day of the week is evaluated to account for differences in the scanned EMF signal and the acceptable matching range is adjusted accordingly. At step 423, the time of year is evaluated to account for differences in the scanned EMF signal and the acceptable matching range is adjusted accordingly. Steps 421, 422, and 423 are performed to account for differences in the individual's body, such as weight and clothing, as a result of the time of day, week, or year. For example, a person may weigh more or wear more layers of clothing at different times of the day, week, or year. The scanned EMF signal is compared to the matching range of "individual EMF" signals at step 424. At step 425, the individual is allowed through the security system if the scanned EMF falls within the matching range or is directed toward a second level of screening if the scanned EMF falls outside the matching range. The scanned signal is stored in the database at step 426 for aggregation with other scanned signals to provide for modification of the benchmark "individual EMF".

Figure 4C:
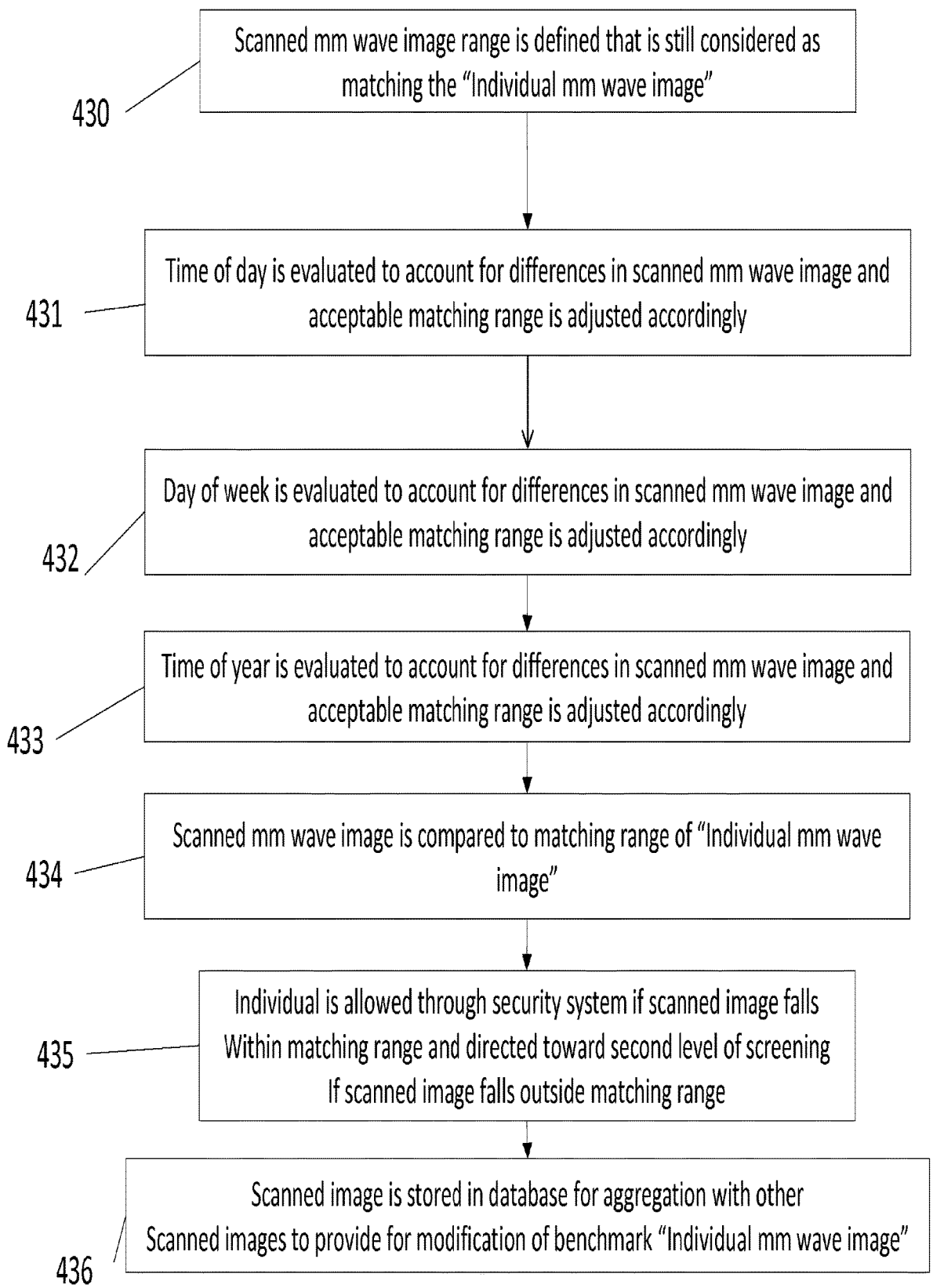
FIG. 4C is a flow chart illustrating the steps involved in comparing scanned data with a predetermined characteristic screening signature of an individual in accordance with another embodiment of the present specification.

FIG. 4C is a flow chart illustrating the steps involved in comparing scanned data with a predetermined characteristic screening signature of an individual in accordance with another embodiment of the present specification. Referring to FIG. 4C, the scanned data (scanned image) and predetermined characteristic screening signature ("individual image") comprise images obtained by a security scanner such as one employing ultra-wide band, millimeter wave, or terahertz technology. The scanned data is generated in the moment and the predetermined characteristic screening signature is stored from the individual's registration process, which can also be altered over time based on differences from a multitude of scans. At step 430, a scanned image range is defined that is still considered as matching the "individual image". In some embodiments, the matching scanned image range is up to 10% different than the stored "individual image", and, more preferably, up to 5% different than the stored "individual image". At step 431, the time of day is evaluated to account for differences in the scanned mm wave image and the acceptable matching range is adjusted accordingly. At step 432, the day of the week is evaluated to account for differences in the scanned mm wave image and the acceptable matching range is adjusted accordingly. At step 433, the time of year is evaluated to account for differences in the scanned mm wave image and the acceptable matching range is adjusted accordingly. Steps 431, 432, and 433 are performed to account for differences in the individual's body, such as weight and clothing, as a result of the time of day, week, or year. For example, a person may weigh more or wear more layers of clothing at different times of the day, week, or year. The scanned mm wave image is compared to the matching range of "individual images" at step 434. At step 435, the individual is allowed through the security system if the scanned image falls within the matching range or is directed toward a second level of screening if the scanned image falls outside the matching range. The scanned image is stored in the database at step 436 for aggregation with other scanned images to provide for modification of the benchmark "individual image".

Figure 4D:
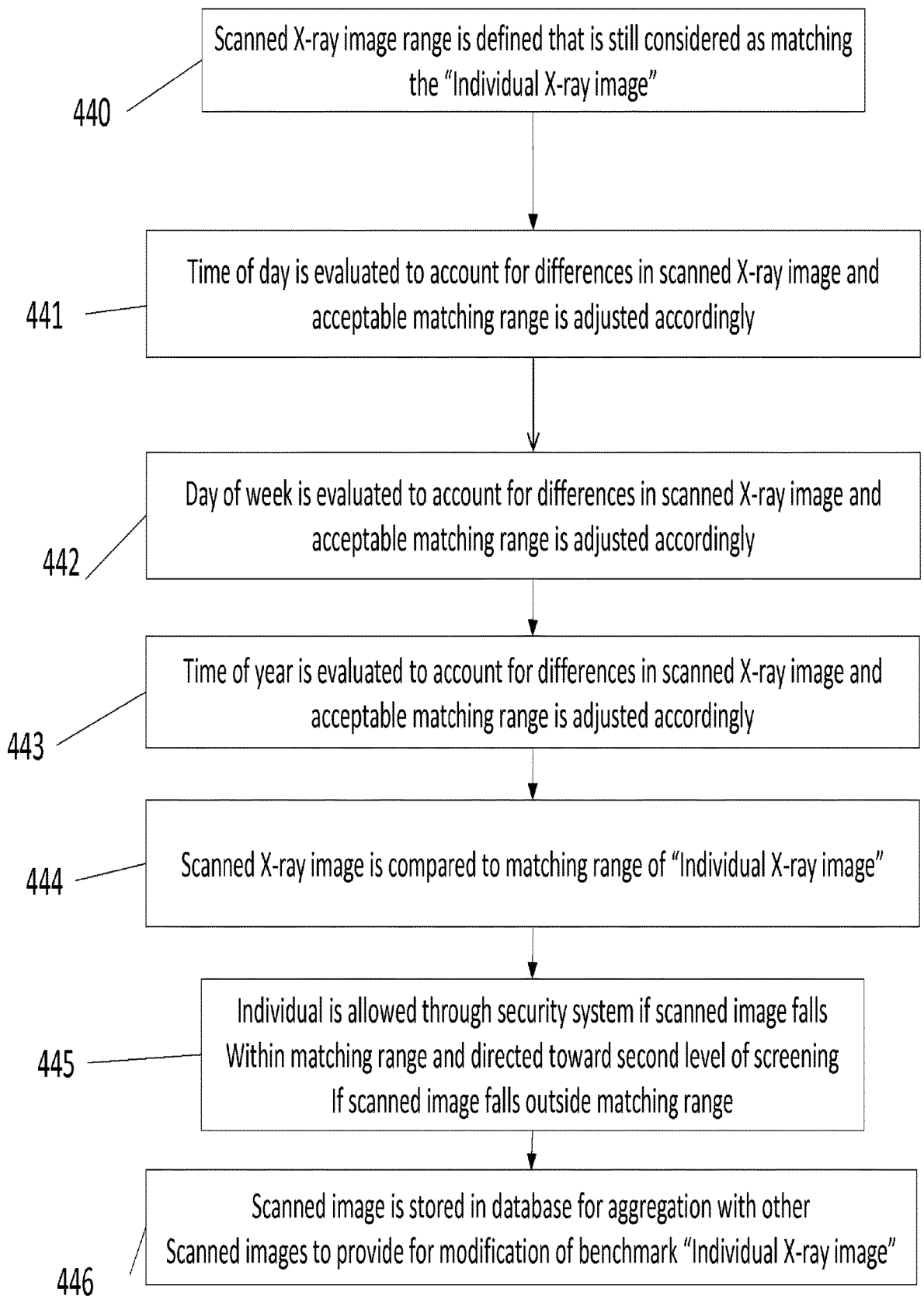
FIG. 4D is a flow chart illustrating the steps involved in comparing scanned data with a predetermined characteristic screening signature of an individual in accordance with yet another embodiment of the present specification.

FIG. 4D is a flow chart illustrating the steps involved in comparing scanned data with a predetermined characteristic screening signature of an individual in accordance with yet another embodiment of the present specification. Referring to FIG. 4D, the scanned data (scanned X-ray image) and predetermined characteristic screening signature ("individual X-ray image") comprise images obtained by an X-ray scanner. The scanned data is generated in the moment and the predetermined characteristic screening signature is stored from the individual's registration process, which can also be altered over time based on differences from a multitude of scans. At step 440, a scanned X-ray image range is defined that is still considered as matching the "individual X-ray image". In some embodiments, the matching scanned X-ray image range is up to 10% different than the stored "individual X-ray image", and, more preferably, up to 5% different than the stored "individual X-ray image". At step 441, the time of day is evaluated to account for differences in the scanned X-ray image and the acceptable matching range is adjusted accordingly. At step 442, the day of the week is evaluated to account for differences in the scanned X-ray image and the acceptable matching range is adjusted accordingly. At step 443, the time of year is evaluated to account for differences in the scanned X-ray image and the acceptable matching range is adjusted accordingly. Steps 441, 442, and 443 are performed to account for differences in the individual's body, such as weight and clothing, as a result of the time of day, week, or year. For example, a person may weigh more or wear more layers of clothing at different times of the day, week, or year. The scanned X-ray image is compared to the matching range of "individual X-ray images" at step 444. At step 445, the individual is allowed through the security system if the scanned X-ray image falls within the matching range or is directed toward a second level of screening if the scanned image falls outside the matching range. The scanned X-ray image is stored in the database at step 446 for aggregation with other scanned images to provide for modification of the benchmark "individual X-ray image".

Figure 5:
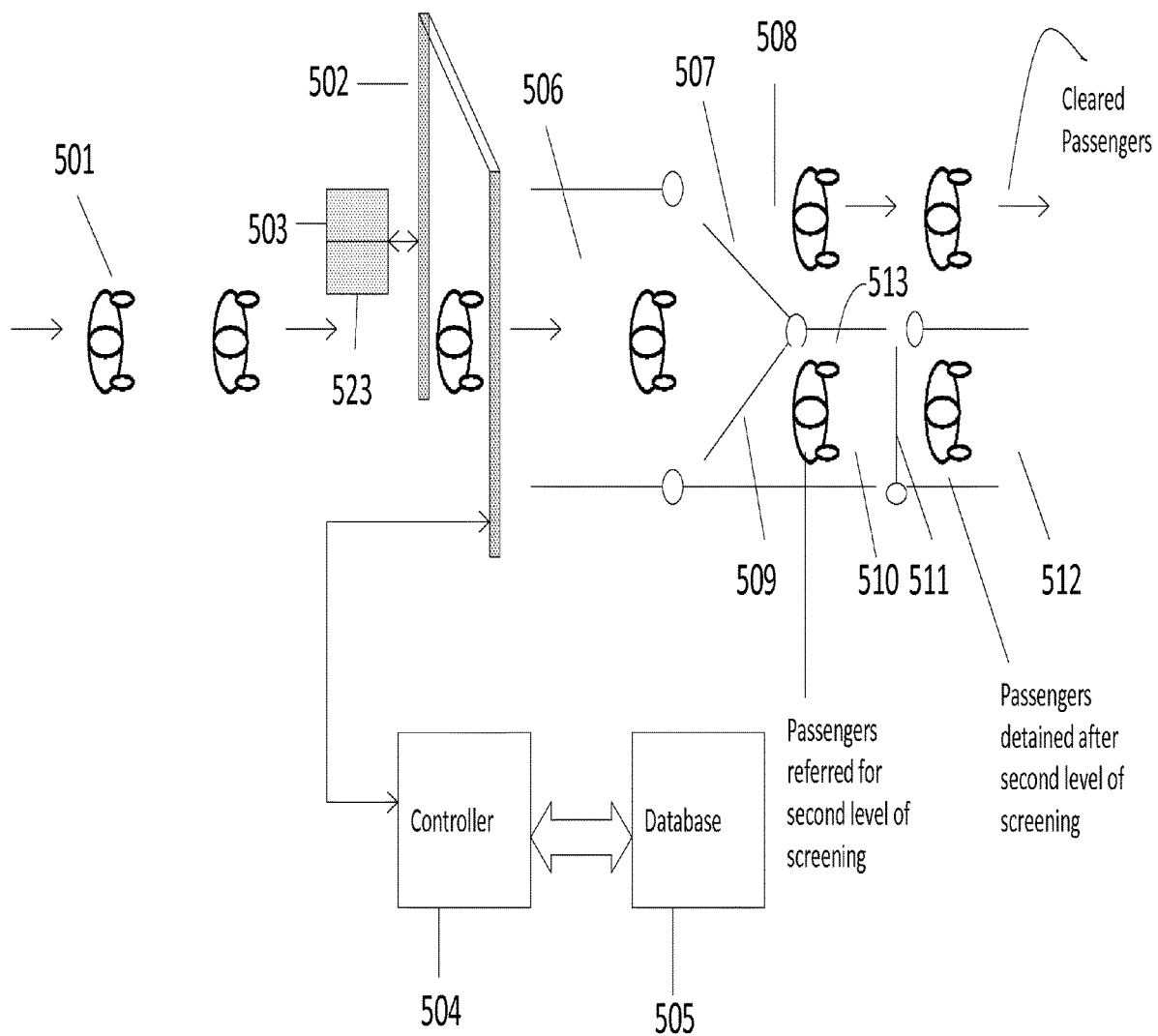
FIG. 5 is a diagram illustrating the movement of passengers passing through a security checkpoint comprising a metal detector in accordance with an embodiment of the present specification.

FIG. 5 illustrates the movement of passengers passing through a security checkpoint employing a metal detector, security scanning system (such as one employing ultra-wide band, millimeter wave, or terahertz technology millimeter wave scanner), or X-ray scanner in accordance with an embodiments of the present specification. As shown in FIG. 5, the incoming passengers 501 are queued in front of the scanner 502. In an embodiment, a tag reader 503 is also positioned adjacent to the scanner 502. The scanner 502 is in data communication with a controller 504, which in an embodiment is located at the security checkpoint. In another embodiment the controller 504 is located at a remote location. In an embodiment, the controller 504 is in data communication with a database 505, which in an embodiment is located at a remote server location. In another embodiment, the database 505 is located locally at the security checkpoint. The database 505 comprises the screening signatures or the benchmark "individual EMFs", "individual images", or "individual X-ray images" for various individuals subscribed to the intelligent screening system in accordance with an embodiment of the present specification. The "individual EMF", "individual images", or "individual X-ray images" corresponding to any individual represents the response characteristic of a metal detector, security scanner, or X-ray scanner when that individual is exposed to the corresponding scanner.

In an embodiment, the incoming passengers 501 who are subscribed to the intelligent screening system have the option to get faster clearance by displaying a unique tag allocated to them in front of a tag reader 503. When any of such passengers 501, who is a subscriber to the intelligent screening system, passes through the scanner 502, a new response data captured by the scanner is estimated which is then compared to the benchmark "individual EMF", "individual image", or "individual X-ray image" corresponding to that passenger, which is stored in database 505. The "individual EMF", "individual image", or "individual X-ray image" corresponding to that passenger is retrieved from the database using the information captured by tag reader when the passenger displays the unique tag in front of the tag reader 503. In another embodiment, a biometric scanner 523 scans the individual in addition to, or in place of, the tag reader 503 to identify the individual and access the stored individual benchmark information. In an embodiment, after passing through the scanner 502, the passenger 501 arrives in an area 506 such that there are two exits from area 506 which are regulated with the help of automatic gates 507 and 509. In an embodiment, if the new response data captured by the metal detector for any passenger 501 is similar to the "individual EMF", "individual image", or "individual X-ray image" corresponding to that passenger, the concerned passenger is provided security clearance at this level and the gate 507 automatically opens allowing the passenger 501 to move to an open area 508. U.S. Pat. No. 8,766,764 and U.S. patent application Ser. No. 14/280,774, both assigned to the applicant of the present specification and incorporated herein by reference in their entirety, disclose automated personnel screening systems comprising a plurality of gates and holding areas which can be used with the intelligent screening systems and methods disclosed herein. U.S. Pat. Nos. 7,660,388 and 7,418,077, also both assigned to the applicant of the present specification and incorporated herein by reference in their entirety, disclose passenger screening stations which can be used with the intelligent screening systems and methods disclosed herein.

In an embodiment, in case the new response data captured by the metal detector for any passenger 501 is not similar to the "individual EMF", "individual image", or "individual X-ray image" corresponding to that passenger, the concerned passenger is directed for a second level of screening such as physical search and the gate 509 opens directing the person to move to an area 510. In an embodiment, the second level of screening is performed on passenger 501 present in the area 510. In case the passenger is cleared in the second level of screening, a gate 513 opens allowing the passenger 501 to move to an open area 508. In case the passenger is not cleared in the second level of screening, a gate 511 opens allowing the passenger 501 to move to a restricted area 512 for further interrogation.

In an embodiment, for passengers who are not subscribed to the assisted screening program, there is no option of getting a fast security clearance through gate 507. After the passage through metal detector, all such passengers have to mandatorily move to area 510 through the gate 509 for a second level of screening which would be often more time consuming.

The above examples are merely illustrative of the many applications of the system of present specification. Although only a few embodiments of the present invention have been described herein, it should be understood that the present invention might be embodied in many other specific forms without departing from the spirit or scope of the invention. Therefore, the present examples and embodiments are to be considered as illustrative and not restrictive, and the invention may be modified within the scope of the appended claims.

In the description and claims of the application, each of the words "comprise" "include" and "have", and forms thereof, are not necessarily limited to members in a list with which the words may be associated.

We claim:

1. An intelligent security management system for expediting security inspection of individuals, the system comprising:
   at least one database comprising one or more data records corresponding to at least one of the individuals being inspected, wherein the data records comprise characteristic first inspection data and wherein the characteristic first inspection data comprises a first screening signature of the at least one individual captured at a first time of day, a first day of week, and a first time of year using a first inspection device; and
   one or more security checkpoints comprising a second inspection device, wherein the one or more security checkpoints is in data communication with the at least one database and wherein the one or more security checkpoints is configured to:
      generate a second screening signature of the at least one individual captured at a second time of day, second day of week, and a second time of year using the second inspection device, wherein at least one of the first time of day, first day of week, or first time of year is different than a corresponding at least one of the second time of day, second day of week, or second time of year, and wherein the second inspection device is a same type of inspection device as the first inspection device; and
      update the characteristic first inspection data using the second screening signature;
   one or more additional security checkpoints comprising a third inspection device, wherein the one or more additional security checkpoints is in data communication with the at least one database and wherein the one or more additional security checkpoints is configured to:
      obtain additional inspection data of the at least one individual, wherein the third inspection device is a same type of inspection device as the first inspection device and the second inspection device;
      compare the additional inspection data of the at least one individual with the characteristic first inspection data of the at least one individual; and
      exempt the at least one individual from additional screening based on the comparing of the additional inspection data with the characteristic first inspection data.

2. The intelligent security management system of claim 1, wherein at least one of the one or more security checkpoints or one or more additional security checkpoints further comprises a tag reader machine configured to read identifying information of the at least one individual from an identification tag in possession of the at least one individual, wherein the at least one of the one or more security checkpoints or one or more additional security checkpoints is configured to use the identifying information to obtain the characteristic data of the at least one individual from the at least one database.

3. The intelligent security management system of claim 1, wherein at least one of the one or more security checkpoints or one or more additional security checkpoints further comprises a biometric reader machine configured to read identifying information of the at least one individual, wherein the at least one of the one or more security checkpoints or one or more additional security checkpoints is configured to use identifying information to obtain the characteristic data of the at least one individual from the at least one database.

4. The intelligent security management system of claim 1, wherein the first screening signature comprises data indicative of a clothing pattern worn by the individual at the first time of day, the first day of week, and the first time of year.

5. The intelligent security management system of claim 1, wherein the second screening signature comprises data indicative of a clothing pattern worn by the individual at the second time of day, the second day of week, and the second time of year.

6. The intelligent security management system of claim 1, wherein at least one of the first inspection device, the second inspection device or third inspection device is a metal detector comprising a plurality of sets of transmitter and receiver coils.

7. The intelligent security management system of claim 6, wherein the characteristic first inspection data of the at least one individual comprises electromagnetic field signals induced in the receiver coils housed in the metal detector when the at least one individual is inspected using the metal detector.

8. The intelligent security management system of claim 1, wherein each of the first, second and third inspection device is at least one of an ultra-wide band scanner, a millimeter wave scanner, a terahertz scanner or a backscatter X-ray scanner.

9. The intelligent security management system of claim 1, wherein the one or more additional security checkpoints is configured to obtain biometric scan data of the at least one individual and compare the biometric scan data with the characteristic first inspection data comprising biometric data of the at least one individual, wherein the biometric scan data comprises at least one of fingerprint data, facial recognition data, or retinal scan data.

10. A method of screening of at least one individual comprising:
   generating a first screening signature of the at least one individual captured at a first time of day, first day of week, and a first time of year using a first inspection device;
   storing the first screening signature in one or more databases as characteristic first inspection data;
   generating a second screening signature of the at least one individual captured at a second time of day, second day of week, and a second time of year using a second inspection device, wherein at least one of the first time of day, first day of week, or first time of year is different than a corresponding at least one of the second time of day, second day of week, or second time of year, and wherein the second inspection device is a same type of inspection device as the first inspection device;
   updating the characteristic first inspection data using the second screening signature;

using a third inspection device, obtaining second inspection data of the at least one individual wherein the third inspection device is a same type of inspection device as the first inspection device and the second inspection device;

comparing the second inspection data of the at least one individual with the characteristic first inspection data of the at least one individual; and exempting the at least one individual from additional screening based on the comparing of the second inspection data with the characteristic first inspection data.

11. The method of claim 10, wherein the first screening signature comprises data indicative of a clothing pattern worn by the at least one individual at the first time of day, the first day of week, and the first time of year.

12. The method of claim 10, wherein the second screening signature comprises data indicative of a clothing pattern worn by the at least one individual at the second time of day, the second day of week, and the second time of year.

13. The method of claim 10, wherein each of the first, second and third inspection device is at least one of an ultra-wide band scanner, metal detector, a millimeter wave scanner, a terahertz scanner or a backscatter X-ray scanner.

14. The method of claim 10, further comprising accessing the characteristic first inspection data of the at least one individual using a unique identification code obtained from an identification tag associated with the at least one individual.

15. The method of claim 14, wherein the identification tag comprises at least one of a radio-frequency identification (RFID) tag, a linear barcode tag, quick response (QR) tag, a magnetic strip or a magnetic chip.

16. The method of claim 10, wherein the first inspection device is a metal detector and the characteristic first inspection data comprises characteristic electromagnetic field (EMF) data.

17. The method of claim 16, wherein the characteristic EMF data comprises biometric data of the at least one individual.

18. The method of claim 16, further comprising obtaining biometric scan data of the at least one individual using the third inspection device and comparing the biometric scan data with the characteristic EMF data comprising biometric data of the at least one individual, wherein the biometric scan data comprises at least one of fingerprint data, facial recognition data, or retinal scan data.

19. The method of claim 10, further comprising generating a benchmark screening pattern by having the at least one individual pass through the first inspection device multiple times.

20. The method of claim 10, wherein the second inspection data is compared to the characteristic first inspection data using a least squares minimization.

21. The method of claim 10, wherein the characteristic first inspection data comprises a plurality of screening signatures and wherein the plurality of screening signatures includes the first screening signature and the second screening signature.

22. The method of claim 10, wherein the characteristic first inspection data comprises a plurality of screening signatures and wherein the first screening data and the second screening data are averaged together if the first time of day and the second time of day are the same.

23. The method of claim 10, wherein the characteristic first inspection data comprises a plurality of screening signatures and wherein the second inspection data is compared with one of the plurality of screening signatures based a time of day, a day of week or a time of year of the obtaining of the second inspection data of the at least one individual.

24. The method of claim 10, wherein the one or more databases is located remote from the third inspection device and wherein an image of the one or more databases is stored proximate the third inspection device.

* * * * *